May 1, 1923.

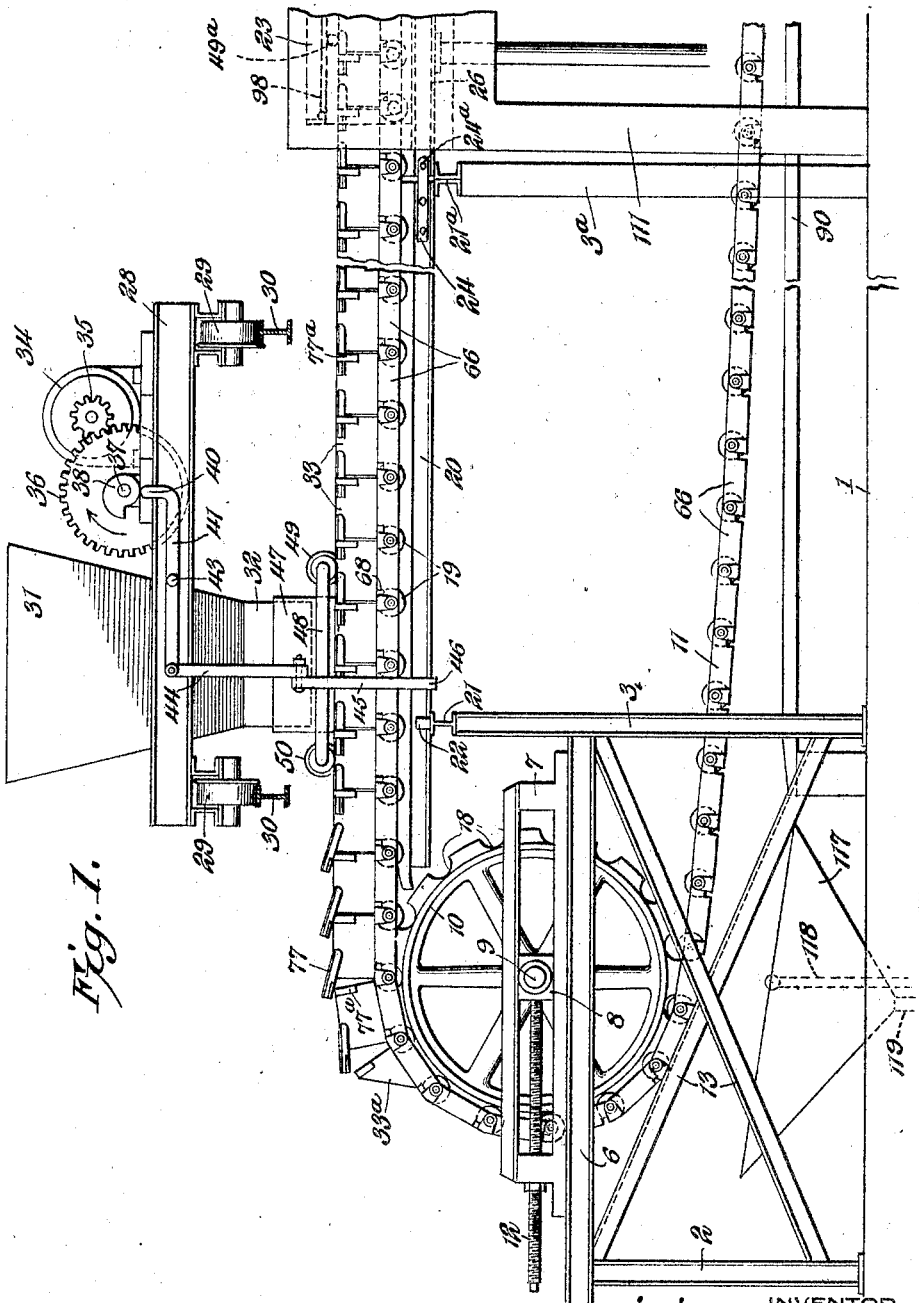

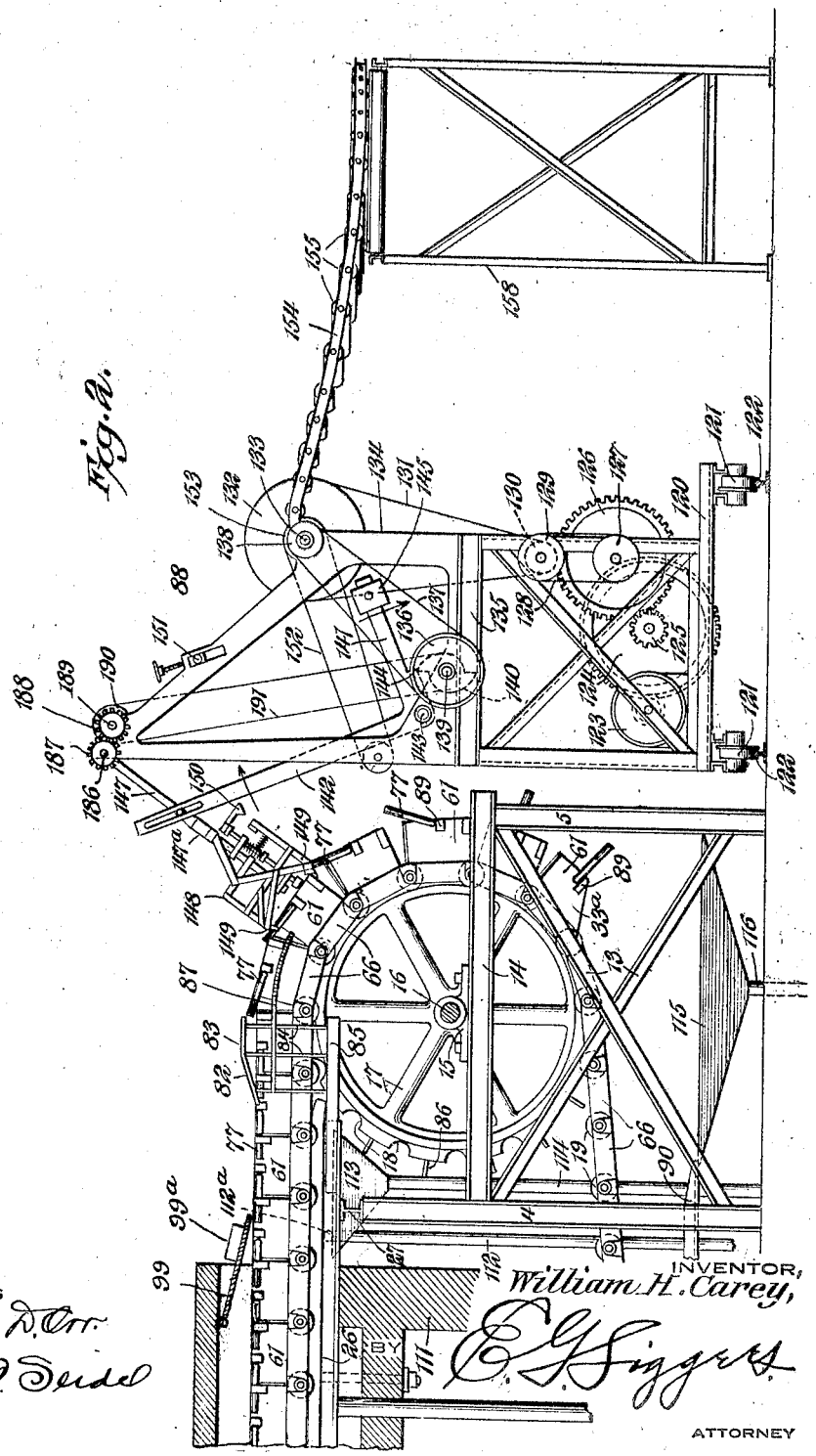

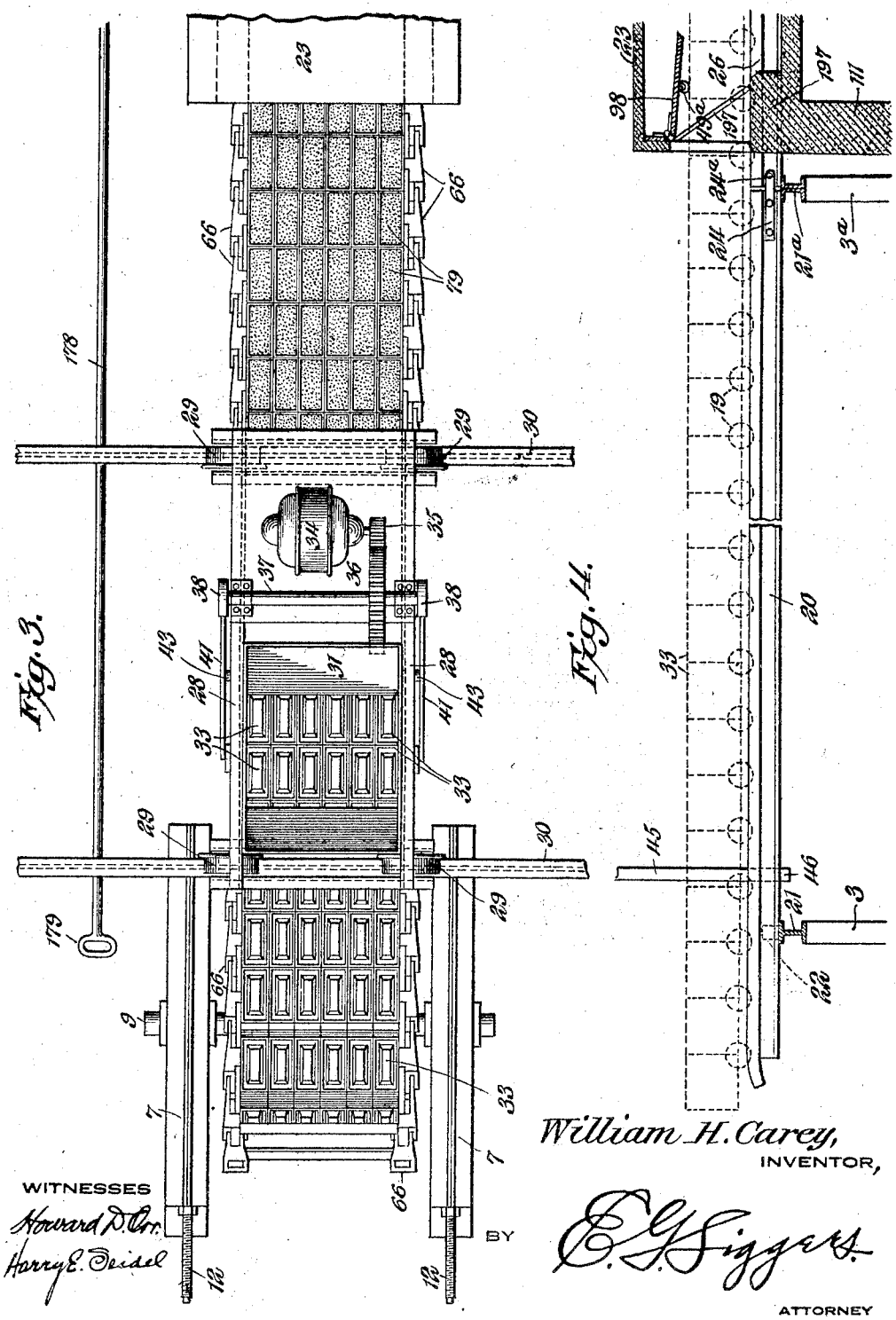

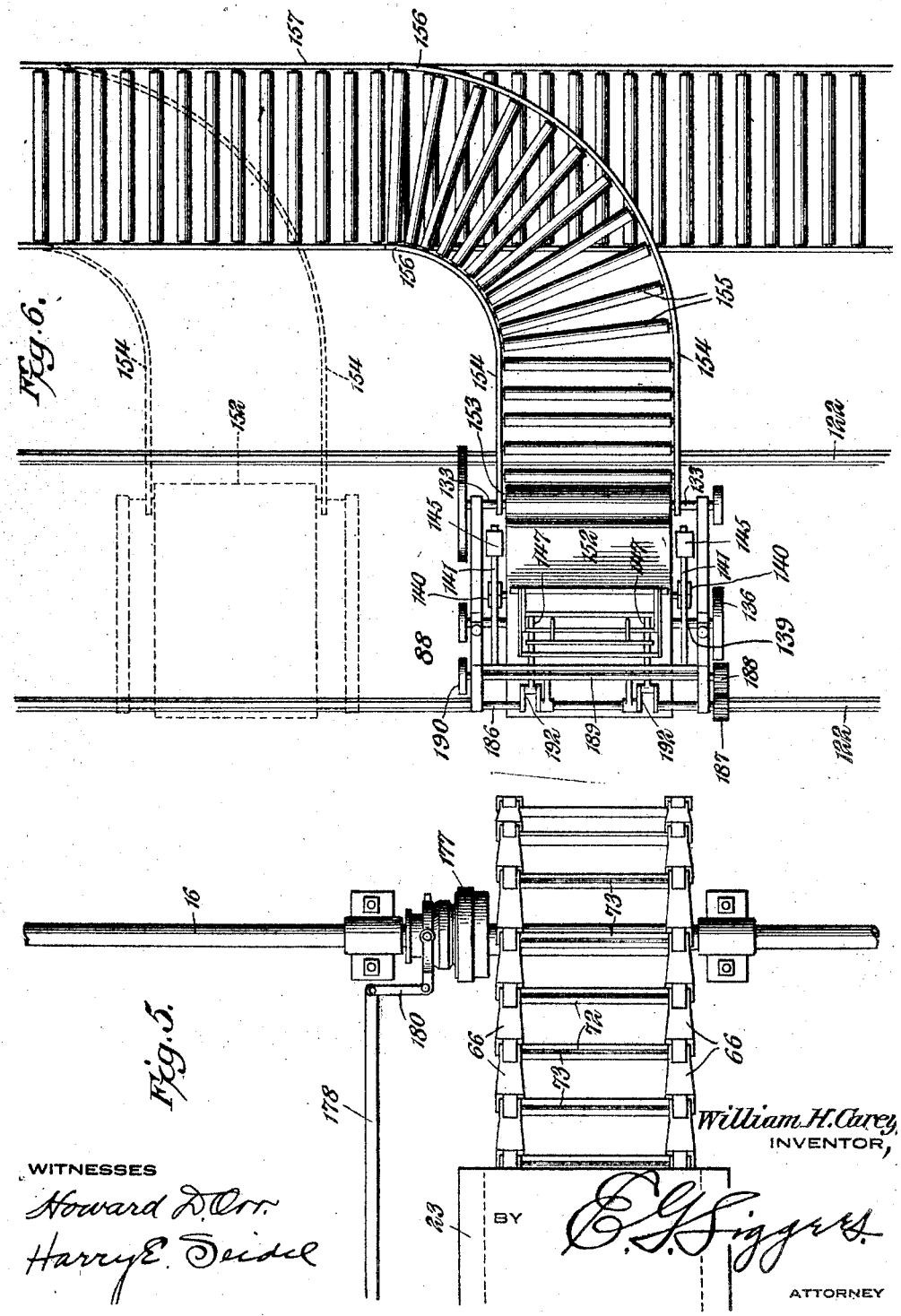

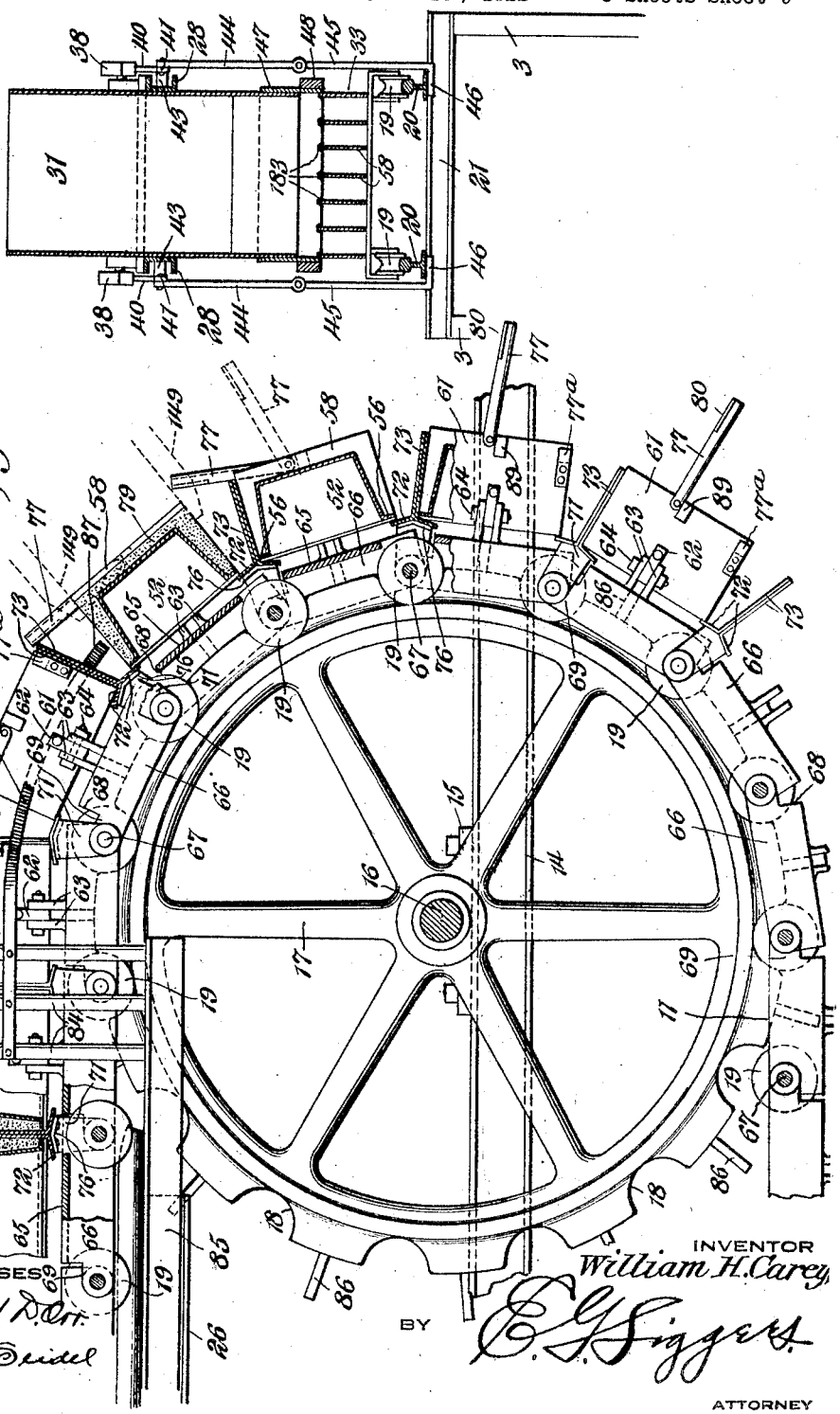

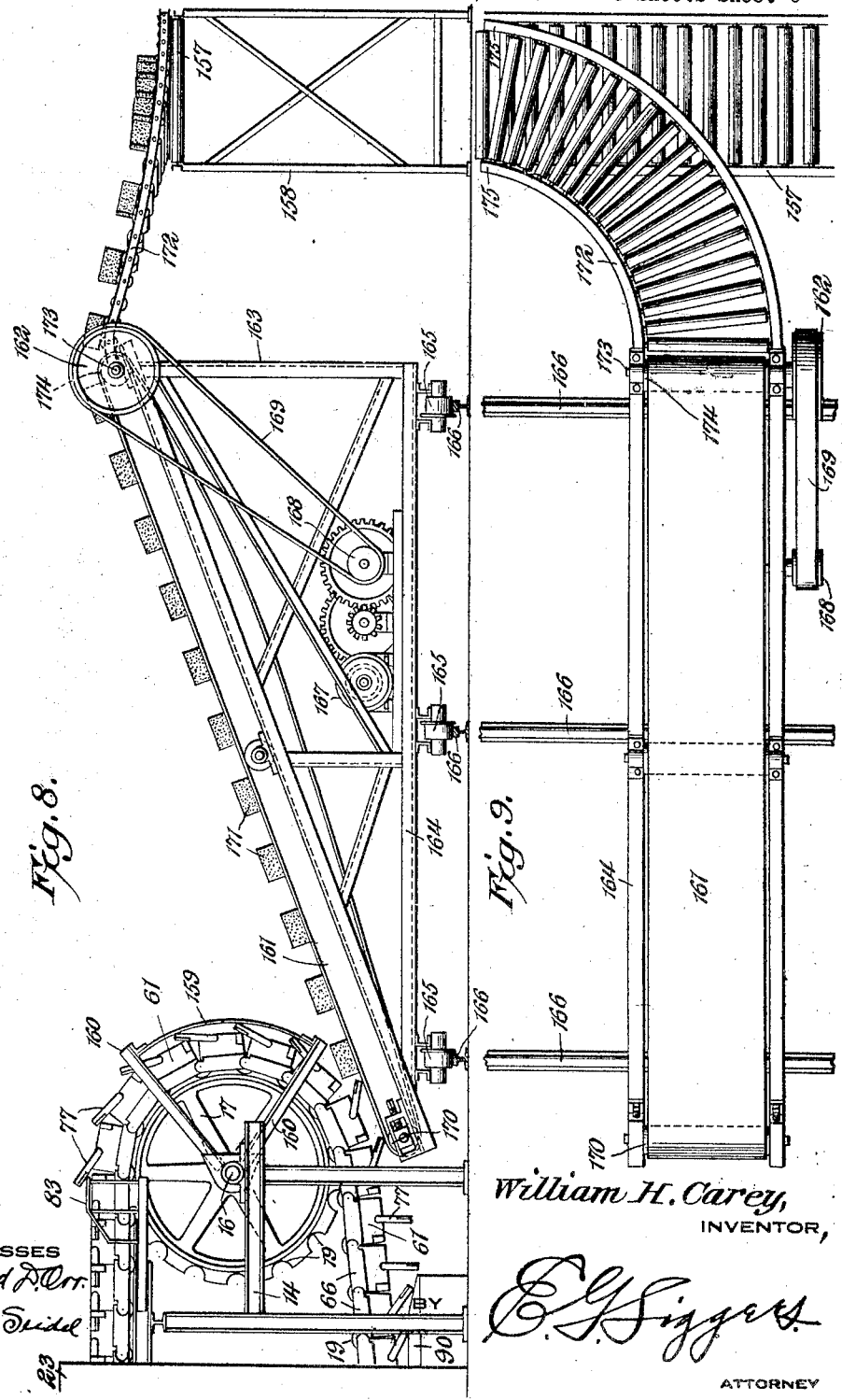

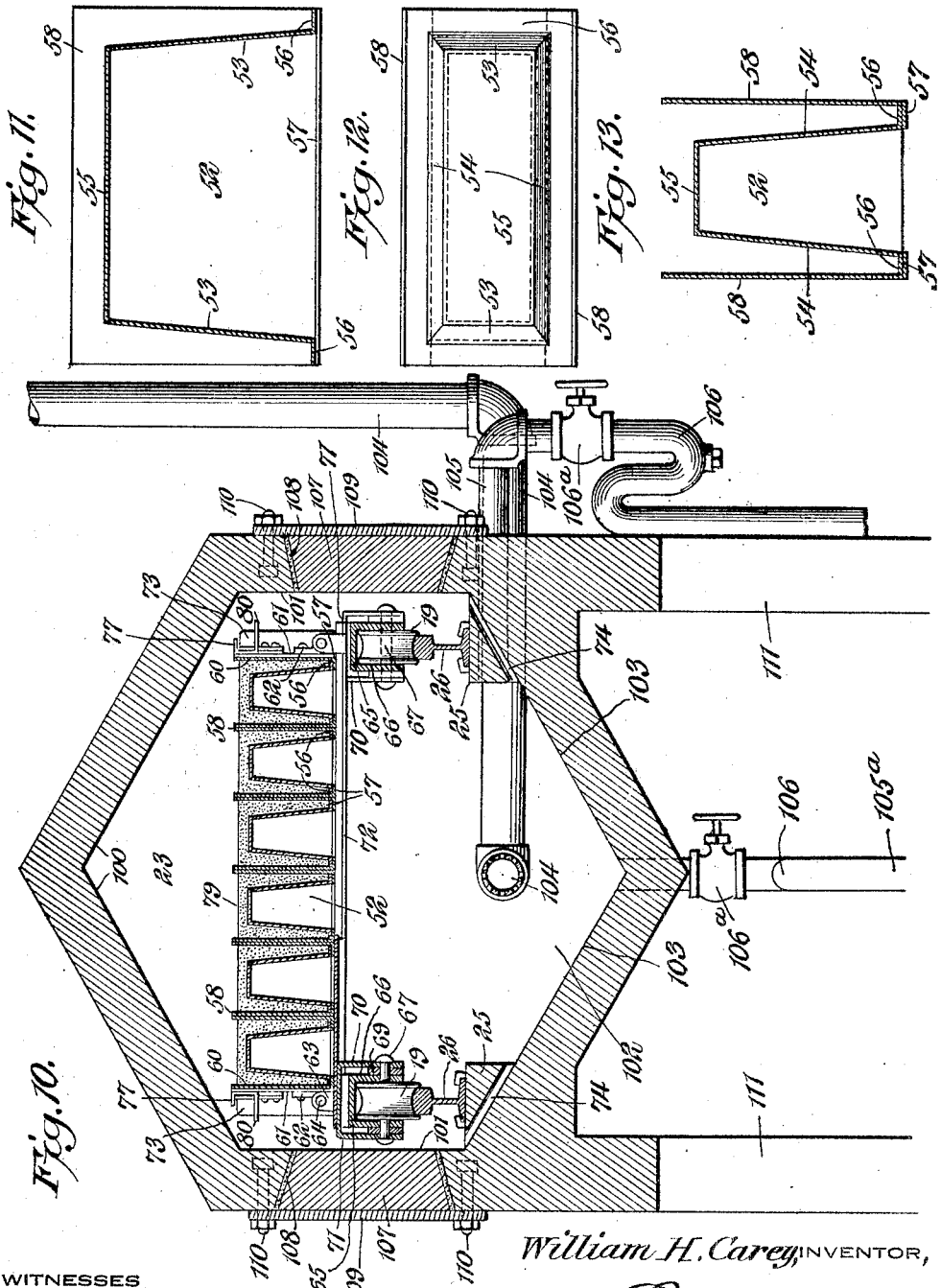

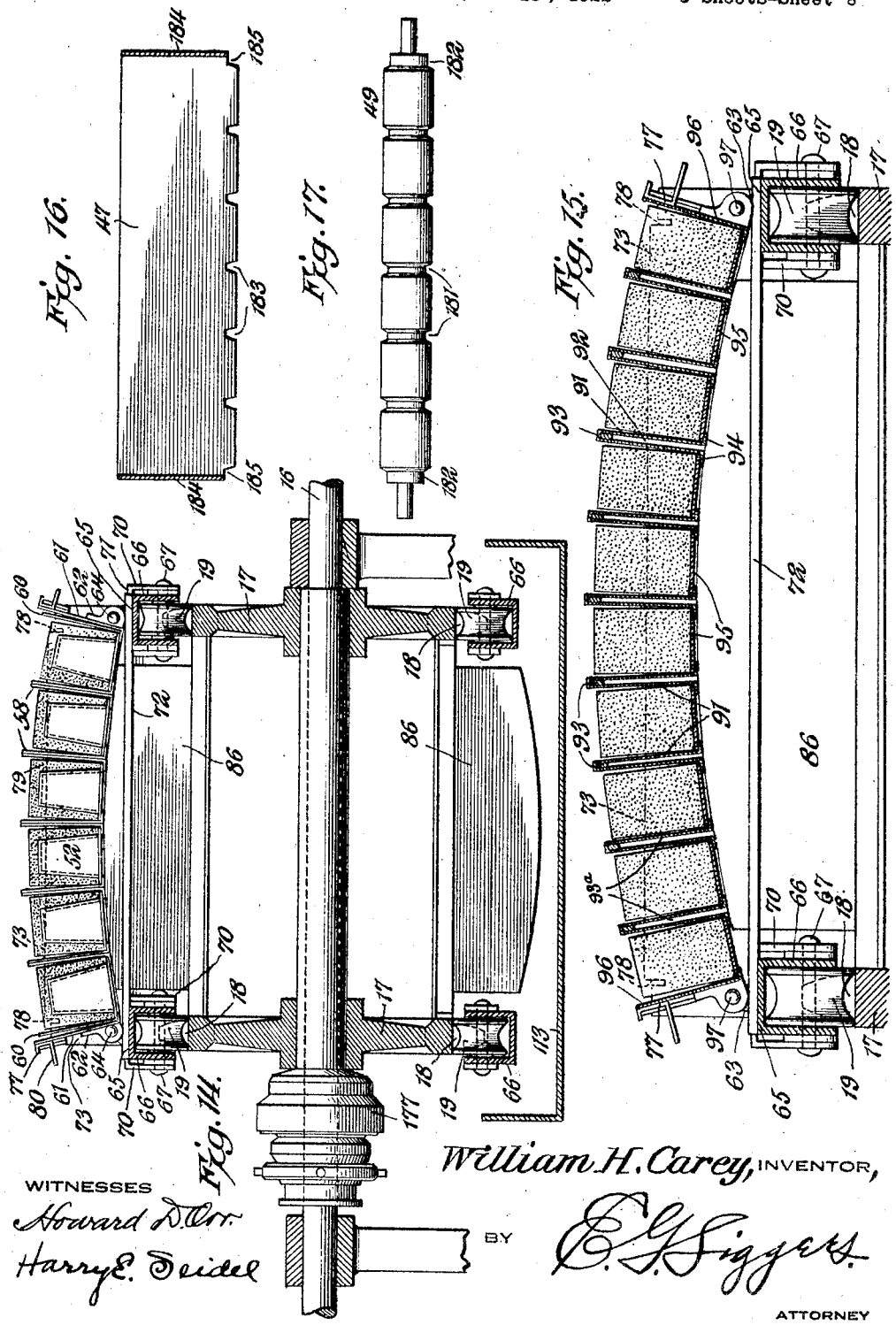

W. H. CAREY 1,453,747

MACHINE FOR MAKING CONCRETE BLOCKS

Filed April 15, 1922  9 Sheets-Sheet 9

William H. Carey, INVENTOR,

WITNESSES

BY

ATTORNEY

Patented May 1, 1923.

1,453,747

UNITED STATES PATENT OFFICE.

WILLIAM H. CAREY, OF WISCONSIN RAPIDS, WISCONSIN.

MACHINE FOR MAKING CONCRETE BLOCKS.

Application filed April 15, 1922. Serial No. 552,980.

*To all whom it may concern:*

Be it known that I, WILLIAM H. CAREY, a citizen of the United States, residing at Wisconsin Rapids, in the county of Wood and State of Wisconsin, have invented a new and useful Machine for Making Concrete Blocks, of which the following is a specification.

This invention relates to brick making machines for forming hollow or solid concrete blocks, and has for its object the provision of a novel machine for forming, curing and removing the bricks from the molds in a continuous mechanical operation.

Another object of the invention is to provide a battery or series of brick forming machines, in which, all the mold carriers are operated by a single shaft; all the molds are filled from a single hopper; and the finished bricks are removed by a single traveling mechanism common to the several machines and movable transversely of the battery or series.

Another object of the invention is the provision of means for filling the molds directly from the hopper mounted above the molds, and simultaneously subjecting the molds to a jarring action, which in connection with the weight of the concrete material in the hopper, causes the production of a concrete block of great density and at a low cost.

Another object is the provision of a jarring means which decreases in intensity as the molds are moved away from the hopper.

Another object of the invention is the provision of an improved form of mold mounted in a series of rows upon a traveling carrier, each mold having its sides flexibly mounted and capable of separation from the cured bricks at a predetermined point in the travel of the carrier whereby the bricks or blocks may be picked from the molds or readily discharged from the same.

Another object of the invention is the provision of a cooling means which will not rust the molds or traveling mold carrier, but will shrink the cores sufficiently, so that the bricks may be readily removed from the molds.

Another object of the invention is the provision of a new and improved picking or discharging device cooperating synchronously with the traveling mold carrier for removing the finished bricks from the molds.

Another object is the provision of a curing chamber into which the molds containing the blocks are moved and wherein they are subjected to the action of any kind of artificial heat, preferably steam for curing or hardening them for a number of hours.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:—

Fig. 1 is a side elevation of the forward end of my machine for making concrete blocks.

Fig. 2 is a side elevation of the rear end of the same.

Fig. 3 is a plan view of that part of the machine disclosed in Fig. 1.

Fig. 4 is a fragmentary view partly in section of the tracks and that portion of the traveling carrier provided with molds.

Fig. 5 is a plan view of the rear end of the traveling carrier disclosing the single shaft for driving a plurality of traveling carriers for a series of machines.

Fig. 6 is a plan view of the picker or unloading mechanism and the gravity roller carrier for the finished bricks.

Fig. 7 is a side view partly in section disclosing the rear end of the traveling mold carrier and the driving sprocket.

Fig. 8 is a side elevation of the rear end of the machine cooperating with an endless belt for discharging solid bricks from the machine.

Fig. 9 is a plan view of the device for receiving and discharging the solid bricks.

Fig. 10 is a vertical cross section of the steam chest or curing chamber.

Fig. 11 is a vertical longitudinal section of a mold for forming hollow bricks.

Fig. 12 is a plan view of the same.

Fig. 13 is a transverse vertical section of the mold.

Fig. 14 is a vertical cross section taken through the driving sprockets located beyond the rear end of the steam chest, the traveling carrier being provided with molds for forming hollow bricks, and disclosing my improved means for flexing the bases of the molds.

Fig. 15 is the same view as disclosed in Fig. 14, but showing the traveling carrier provided with molds for forming solid bricks and the means for causing the sides of the molds to be forced out of engagement with the cured bricks.

Fig. 16 is a sectional view of the movable sleeve at the bottom of the hopper.

Fig. 17 is a side view of one of the packing and leveling rolls.

Fig. 18 is a transverse section through the hopper, mold carrier and proximate parts.

Fig. 19 is a front end elevation of the curing chamber disclosing a filler in the entrance to said chamber which is used when a door is dispensed with.

Figure 19:
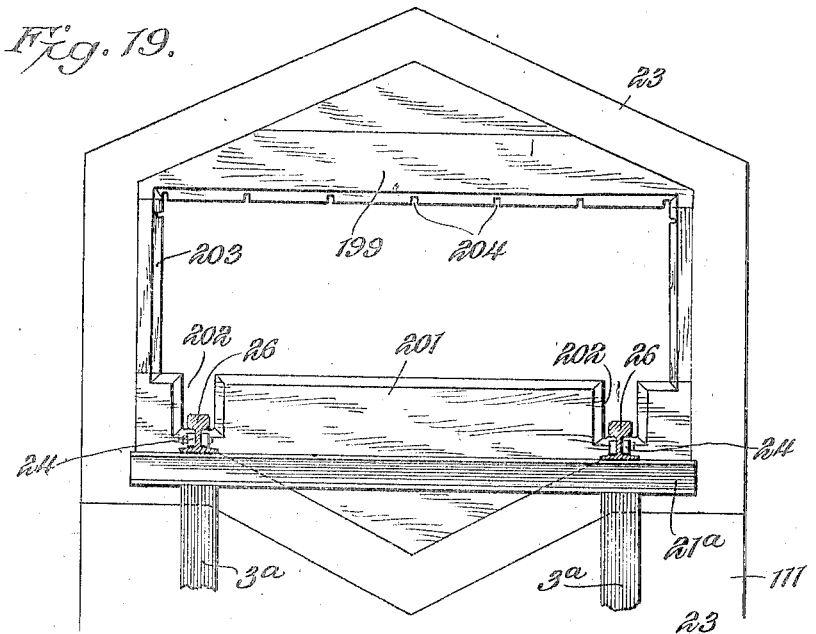

Referring to Figs. 1 and 2 of the drawings, 1 indicates the floor to which are secured pairs of spaced vertical standards 2, 3, 4 and 5, one at each side. Upon the upper ends of the spaced standards 2 are mounted horizontal beams 6 having their other ends secured to a point on the standards 3 intermediate their ends, and forming a support for open frames 7, in each of which is slidably mounted a bearing block 8 for a shaft 9 disposed transversely at the forward end of the machine. Loosely mounted upon the shaft 9 are a pair of spaced sprockets 10 for supporting the forward end of the traveling mold carrier 11. A screw 12 mounted in each of the frames 7 is adapted to adjust the bearing blocks 8 to maintain the traveling carrier 11 taut. Diagonally disposed braces 13 secured at opposite ends to the standards 2 and 3 are adapted to brace said standards.

The spaced vertical standards 4 and 5 support horizontal beams 14 which carry bearings 15 for a drive shaft 16. (Fig. 2.) The shaft 16 carries a pair of spaced sprockets 17 by which the traveling carrier 11 is driven. Braces 13 are employed for bracing the standards 4 and 5 in position, the same as standards 2 and 3.

Each of the spaced sprockets 10 and 17 are provided with semi-circular grooves or channels 18, engaged by grooved wheels 19 of the carrier 11, said wheels riding upon spaced rails 20 when the traveling carrier 11 is moving in its overhead position. The diameter of the grooved wheels is substantially identical with the diameter of the semi-circular grooves 18, whereby the wheels will find a firm seat in the grooves, and when so engaged the traveling carrier 11 is driven by the sprockets 17.

The forward ends of the spaced rails 20 rest on a transverse I-beam 21 forming an anvil, and are freely movable between guides 22 mounted on the anvil 21. The inner or other ends of the rails 20 rest on an anvil 21ª supported by a standard 3ª just outside of the steam chest or curing chamber 23 and are pivotally connected by a strap 24 and bolt 24ª to the extended ends of rails 26 secured to the anvil 21ª whereby the forward ends of the rails 20 may be oscillated. (Fig. 1.)

Rails 26 are disposed in alinement with and slightly spaced from the inner ends of the rails 20 and secured to offset portions 25 of the steam chamber 23 and extend longitudinally through the latter and beyond the other end of said steam chest, where the projecting ends of said rails are mounted upon a transverse beam 27 supported by the vertical standards 4. (Fig. 2.) The rails 26 in the steam chest are fastened to the chest by bolts which are passed downward through the floor of the chest and locked in place by nuts. Gaskets are employed on the bolts to prevent leakage of steam.

The rails 20 are mounted so as to be raised and dropped by mechanism to be presently described. The rails 26 are rigidly mounted and have no movement.

A carriage 28 having wheels 29 is adapted to ride on spaced rails 30 rigidly supported in any approved manner transversely above the traveling carrier 11. Said carriage supports a hopper 31 having a contracted lower end 32 which depends below said carriage. The mouth of the contracted portion 32 of the hopper 31 is sufficiently wide to span two rows of molds 33, and long enough to embrace within its side edges the full length of said rows of molds, as shown in Fig. 3.

In practice, where a very large output is required, I employ a series of machines arranged side by side and driven by the shaft 16. In consequence, the rails 30 extend transversely across the mold carriers of the several machines so that the hopper 31 may be moved along the rails by means of the carriage 28 and thus fill in succession any group of molds located on any one of the machines. In other words, the hopper supplies all the machines with concrete.

Mounted at one side of the hopper 31 on the carriage 28 is a motor 34 adapted to drive a spur wheel 35 which is in mesh with a gear wheel 36 mounted upon a shaft 37. On the outer ends of said shaft are secured cams 38 against which the upturned fingers 40 of the levers 41 are adapted to ride, said levers being pivotally mounted on the carriage 28 at 43.

Figure 3 shows the cams 38 and levers 41 duplicated, one at each side. The other end of each lever 41 is pivotally connected by means of a link 44 to a shaker arm 45, which has an inwardly bent finger 46 engaged beneath the spaced rails 20 in rear of the anvil 21, whereby when the fingers 40 of the levers 41 are depressed by the cams 38, the links 44 and shaker arms 45, together with fingers 46, which are duplicated as shown in Fig. 18, are elevated, raising the rails 20 as well as the traveling carrier 11 and the molds 33. When the fingers 40 reach the low part of the cams 38, the levers 41 will return to their normal position, while the forward ends of the rails 20 will suddenly drop back upon the anvil 21, causing a decided jar to the traveling carrier 11 and the molds 33, which are traveling beneath the hopper 31 and being filled with concrete from said hopper.

The cams 38 are adapted to be rotated about one hundred times a minute so that a periodic raising and sudden dropping of the rails 20 will be maintained, the forward ends of the rails being elevated at least a quarter of an inch. All the molds passing over the rails 20 will be likewise raised and dropped, which, because of the construction and position of the hopper causes a repeated jarring of the plastic concrete in the hopper. The molds 33, are filled directly from the hopper 31, and they close the bottom of the hopper (Fig. 18), so that the concrete in the molds is borne upon by the weight of all the concrete in the hopper 31, and it exerts a pressing action on the concrete in the molds.

Since the inner end of each rail 20 is immovably secured at 24, the molds traveling over the rails will be jarred to the fullest extent at the point along the rails 20 where the rails are elevated and dropped suddenly on the anvil 21. As the molds pass from this point, they will be jarred with a force which gradually diminishes in proportion to the distance that the molds move away from the anvil 21, and when the carrier begins to travel on the rails 26 at the entrance of the steam chest, the jarring ceases. No jarring action is given to the molds after they have entered the steam chest 23.

A sleeve 47, mounted to slide in a vertical direction on the neck or contracted portion 32 of the hopper 31, is provided with a rectangular frame 48 secured to its lower end, the front and rear ends of the frame carrying rollers 49 and 50, respectively, which are adapted to traverse the upper edges of the molds 33 as the carrier travels along and roll or pack the top surface of the formed concrete blocks within the molds 33 and remove any excess concrete.

The sleeve 47 is elevated when the molds 33 and the rails 30 are raised by the arms 45, since the rollers 49 and 50 rest on the upper edges of the molds, and the sleeve with the frame 48 provides a loose joint between the neck portion of the hopper 31 and the upper edges of the molds. The sleeve closes the space between the bottom of the hopper and the molds and prevents the concrete dropping from the hopper from spilling. (Fig. 18.)

The construction and further functions of the rollers 49 and 50, and the sleeve 47, which are disclosed more fully in Figs. 16 and 17, will be presently described in connection with a description of the molds 33 with which these elements have special cooperation.

The pivoted connections between links 44 and arms 45 permit arms 45 to be folded back upon said links when the hopper 31 is moved on the rails 30 to another machine.

The hopper 31 is filled with a plastic mixture of concrete which is continuously supplied to said hopper by means of buckets of a well known construction and carried to said hopper by a carriage rolling on rails 51, which are mounted in spaced relation above the top of the hopper 31. I have not thought it necessary to show this as it is the ordinary construction.

The concrete which is especially adapted for forming the bricks in my improved brick making machine is what I term a "normal consistency mixture," and which when referred to as such throughout the specification and claims, designates a mixture formed by adding only a sufficient amount of water, no more, no less, to the concrete than is necessary to provide a concrete mixture of ideal plastic consistency, which produces the strongest and most waterproof product possible, to distinguish it from the sloppy or wet mixture, or the damp mixture having insufficient water, which can only be employed in other known brick making machines, and which machines are not capable of using the normal consistency mixture as indicated above.

The molds, which are adapted to form the hollow bricks, and which are placed six in a row and in a series of at least 250 rows along a portion of the endless traveling carrier, are each formed of a hollow metal core 52 having slanting sides 53 and 54, a top 55, and a horizontal marginal flange 56 at the open end of the core 52, the longitudinal side edges of the flange 56 being welded to a flanged base portion 57 of longitudinal vertical sides 58 of the mold. (Fig. 11, 12 and 13.) The molds are placed with their adjacent sides 58 in abutting relation and welded together, so that in effect the welded sides 58 form a common side for adjacent molds in the row, except the end sides 60 of the molds located at the ends of each row. (Fig. 10.) These end sides are welded to sides 61 which form the extreme outer ends of a row of molds, while the flanges 57 on the lower edge of sides 60 are welded to that portion of the marginal flange 56 of the core which is adjacent to the sides 60.

A lug 62 is provided near the lower edge of each side 61 of the end molds of a row, and has a pivotal connection with a pair of ears 63 by a pin 64. The ears are rigidly mounted upon the top plate 65 of each of the channel-shaped links 66, which form part of the flexible mold carrier 11. The adjacent ends of the sides of the links are pivotally connected together by pins 67, the pins 67 forming the axles for the grooved wheels 19. which support the mold carrier on the rails 20 and 26. The links are cut away at each end as shown at 68 in Fig. 7, forming reduced portions 69 of the sides of the channel-shaped links at each end thereof, whereby a small amount of movement or play is permitted between the links when they reach the loose sprockets 10 and the driven sprockets 17.

Upon the pins 67, and in engagement with the sides of the links 66, are pivotally mounted ears 70 of a U-shaped support 71, (Figs. 7 and 10), providing a supporting means for the opposite outwardly-disposed bases 72 of the cross division plates 73, which bases and ears form a protective covering for the wheels 19 to prevent concrete from falling on said wheels. A pair of the cross division plates 73 are welded together and in effect form a single cross division plate or common end between adjacent rows of molds, as shown in Figs. 7 and 10. The top 76 of the U-shaped support 71 is inclined downwardly from its center (Fig. 7) so that the inclined bases 72 of the cross division plate 73 will neatly fit on said top and are secured thereto in any approved manner. Since the cross division plates 73 are secured to the U-shaped covering 71, which is pivotally mounted on the pin 67, they will be free to oscillate at certain times during the movement of the carrier. The ends of base flanges 57 of longitudinal vertical sides 58 will rest upon the bases 72 of the cross division plates 73, whereby the rows of molds are supported transversely of the traveling carrier.

Pivotally mounted on the outer longitudinal sides 61 of the end molds of a row, are latches 77, the intermediate portions of which are adapted to be seated within a slot 78 (Figs. 14 and 15) adjacent the ends of each of the cross division plates 73 and engaged by keepers 77ª, (Fig. 1), formed on the ends of the sides 61 which is opposite to the pivotal point of the latches, whereby the sides 61 of the end molds are not only locked in position but are maintained in alinement. The latch of one side engages the keeper of the next adjacent side, by end of flange 80 on latch 77. An outstanding flange 80 is located on the lower edge and near the free end of each of the latches 77. One end of said flange engages the keeper, thus locking molds in position. As the molds pass from the steam chest 23, carrying the cured bricks 79, these flanges are adapted to engage trip bars located upon opposite sides of the mold carrier and each having an inclined portion 82, and a horizontal portion 83. (Fig. 7.) The trip bars are mounted rigidly upon standards 84, which are in turn attached to beams 85 secured to and projecting outwardly from the ends of the rails 26. When the flanges 80 of the latches 77 reach the inclined portion 82 of the trip bars, as shown in Fig. 7, they will ride upwardly and release the latches 77 from the slots 78, whereby the intermediate longitudinal sides 58 and the outer sides 61 of the molds will be forced away from the sides of the bricks 79, when the traveling carrier is passing over the sprockets 17, at which time the bases of a row of molds are engaged by the curved heads of transverse bars 86 (Figs. 7 and 14), which connect the spaced driven sprockets 17 and thereby cause the flexing of said bases. The curvature of the sprocket, as the traveling carrier engages the same, will likewise cause the rows of molds to be separated from each other and the cross division plates 73 from contact with the molds in adjacent rows.

The circumference of the sprockets is so proportioned with relation to the space between the transverse centers of adjacent rows of molds, and likewise between two adjacent bars 86, that the curved heads of said bars will always engage the transverse center line of the bases of the molds. (Fig. 7.)

Due to the fact that the pivotal point 64 of the end sides of a row of molds is located above the horizontal plane of the base of a row of molds, the lower edges of the end sides of the molds will swing inwardly towards each other, while the top edges will swing outwardly when the curved heads of the transverse bars 86 engage with and flex the bases of a row of molds.

Since the cross division plates 73 would fall forward by gravity and remain in contact with next forward row of molds passing downward over sprockets 17, I provide corrugated springs 87 mounted horizontally upon the standards 84 and at opposite sides of the mold carrier for engaging the cross division plates 73, retarding the same and preventing their interference with the jaws of the unloading mechanism in gripping the bricks. (Fig. 7.) The free end of each spring is corrugated, and it engages the end of the cross division plate which projects beyond each side of the end mold and thus retain the cross division plates against the cured bricks in the succeeding row, when the molds begin their travel around the sprockets 17. Before the free ends of the springs 87 leave the ends of the cross division plates, a discharging or unloading mechanism 88 grips the cured bricks and removes the same.

As shown in Fig. 2, when the bricks have been removed by said unloading mechanism 88, the latches 77 will tend to fall by gravity to a position which is opposite to their normal positions while the molds are passing beyond the horizontal plane with respect to the shaft 16 of the sprocket 17. Blocks or stops 89, mounted on each of the sides 61 of the end molds, engage the latches 77 and limit the rearward movement of said latches. When the molds have passed beyond the driving sprocket 17, they will pass above a track 90, (Figs. 1 and 2), and the latches 77 will engage said track and be returned to near their normal position, so that as the molds are carried upwardly by the sprockets 10, at the forward end of the machine, the latches will fall by gravity back to their normal positions until they come beneath the rollers 49 and 50, where they will be depressed and forced again into the respective slots 78 adjacent the ends of the cross division plates 73. When the wheels 19 of the carrier 11 are riding on the rails 20, the longitudinal sides of the molds will be returned to their normal vertical positions, since the bases of the molds will then be horizontally positioned.

As shown in Fig. 17, the rollers 49 and 50 are provided with spaced annular grooves 181, adapted to engage the upper edges of the intermediate longitudinal sides 58 of the hollow or solid brick molds in such a manner that the upper edges of said sides will not only ride in said grooves, but the intermediate sides of the molds in succeeding and preceding rows of molds will be alined and held in place while being filled with the normal consistency concrete from hopper 31. The outer ends of the rollers are reduced in diameter, as shown at 182, which reduced portions are adapted to ride on the upper edges of the outer sides 61 of the end molds and engage the latches 77 for forcing said latches into their respective slots 78 provided adjacent the ends of the cross division plates 73.

Cooperating with the annular grooves 181 of the rollers 49 and 50, and alining the intermediate sides 59 of the molds while being filled by the hopper 31, are spaced notches 183 formed in the lower edges of the front and rear walls of the slidable sleeve 47 of the hopper and in alinement with the grooves 181 of said rollers. The lower edges of the longitudinal sides 184 of the sleeve 47, together with the opposite ends of the lower edges of the front and rear walls of the sleeve, are cut away to form grooves 185, in which the upper edges of outer sides of the end molds and the latches 77 ride.

The grooves 181 of the rollers and the grooves 183 of the sleeve 47 are wider at the entrance than at the base of the grooves, whereby the sides are sloped, the grooves gradually narrowing until just enough room is had at the base of the grooves for the intermediate sides 58 to pass. The object of this is to provide sufficient width at the mouth of the grooves to engage a side of any mold that may be out of line, and force the same in proper vertical position. It will only be necessary to employ this form of groove having the enlarged mouth in roller 49 and at the receiving or front wall of the sleeve 47.

The grooves in the rollers 49, 50 and the front and rear walls of the sleeve 47 are designed to hold the intermediate side walls of the molds in line while being filled. After they are filled, the concrete will hold them in line. The outer walls of the end molds of each row are held rigid by the latches engaged in the slots adjacent the outer ends of the cross division plates.

The cross division plates 73 are about ¼" below the level of the tops of the intermediate side walls 58, and the portion of the rollers 49, 50 between the grooves 181, also the portion of sleeve between notches 183 acting as a strike-off, will ride in the molds below the tops of the intermediate side walls and thereby act as an auxiliary compacting means for the concrete in the molds, and likewise as a means for leveling off the tops of the green concrete blocks.

Figure 20:
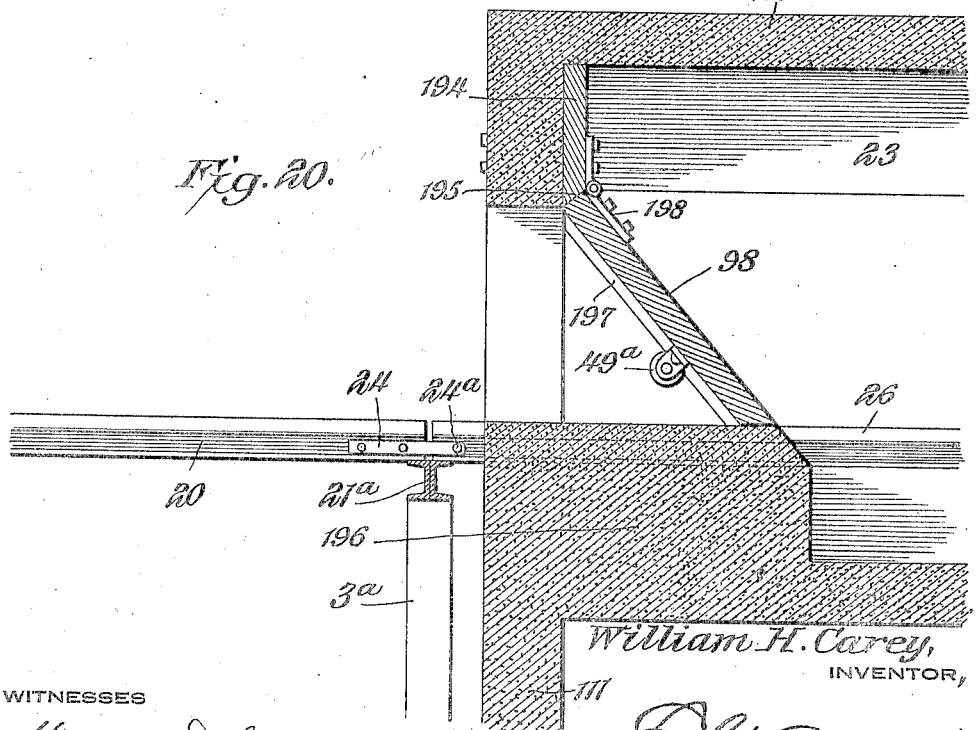
Fig. 20 is a fragmentary view in detail disclosing a vertical section of the forward end of the curing chamber and a gravity-operated closure for the same.

A roller 49$^a$ may be employed to imprint the name and address of the manufacturer, and as such will be located just at the entrance to the steam chest, and rotatably mounted on the outside of door 198, at a point in the travel of the mold carrier where all vibration has ceased. Fig. 20. This roller is shorter than width of the molds so that the roller may ride on top edges of the intermediate side walls of the molds and do not touch the side walls and affect the latches, as do the rollers 49 and 50.

When the traveling carrier is equipped with molds for forming solid bricks, a different form of mold is used, as shown in Fig. 15. Instead of welding two pieces to form a common longitudinal side, the sides 91 are spaced apart as shown at 92, their upper edges and ends being welded to an intermediate longitudinal bar 93, which has vertically bent portions 93$^a$ welded between the ends of adjacent sides of the molds. The lower edges of the sides 91 are spaced apart and form an opening for the circulation of steam to the space 92 between the sides of the mold. Instead of directly welding the adjacent intermediate sides 58 of a hollow brick mold together as shown in Fig. 14, they may be spaced apart by a horizontal bar 93 with depending vertical side bars 93$^a$ which produces a construction similar to that disclosed in Fig. 15 for solid brick molds, thereby leaving a space between the sides 58 for the circulation of steam, and an opening between the lower edges of said sides connecting the space to the outside. This spacing of the sides of the molds of the hollow brick type is especially necessary when a single machine is used, since it will hasten the curing of the bricks in the curing chamber. These solid brick molds are made of one piece bent intermediate its ends at right angles, the lower edges being bent outwardly at right angles providing flanges 94 and form a support for the base 95 of the mold and to which flanges said base is welded. The outer sides 96 of the end molds of each row are pivotally mounted at 97 to ears 63, which are formed upon the top plates 65 intermediate of the ends of the channel-shaped links 66 of the mold carrier. The pivotal mounting of the sides 96 of the molds for forming solid bricks is identical in every respect with the mounting of the sides 61 of the end molds for forming hollow bricks. The latches 77, the slots 78 for said latches, and the cross division plates 73, are similarly employed in this construction, with the ends of the bases of the molds resting upon the base flanges 72 of the cross division plates.

The steam chest or curing chamber 23 is provided at the front end with a gravity closure 98 of any approved construction, which is adapted to drop into closing position after the last mold in the series has passed within the steam chest. It is noted that first and last molds 33ª have an inclined face or wall, as shown in Figs. 1 and 2, and are what are known as dummies. A similar door 99 is mounted to work in the same way as the other end of the steam chest, and which is adapted to be maintained in closed position while the molds are located within the chest and being cured. A weight, as 99ª, may be mounted on said door in order to aid in closing the door and resisting any pressure tending to force it open other than the pressure exerted by the dummy 33ª, when the inclined face of the moving dummy engages the door and opens the same. In this way, the steam chest is kept closed. Internal pressure on the door 98 will maintain said door closed.

As shown more particularly in Fig. 10, a gable roof is preferably provided for the curing chamber or steam chest, in order that steam, which has been condensed on the inclined walls 100 of the roof will drain downwardly from the roof along the sides 101 of the curing chamber, and through the passages 74 into a pit 102, forming the bottom of said chamber, and which has inclined sides 103 forming a trough for the reception of the water condensed from the steam. Offset ledges 25 disposed at opposite sides of the pit 102 support the rails 26 above the level of the water, so that the steam which enters the pipe 104 has sufficient space above and below the molds to circulate and thereby properly cure the bricks in the molds.

Pipe 104, being perforated at intervals along the pit 102, is connected to any source of steam supply and carried through one wall of the steam chamber and downwardly to the pit 102, and along the latter. Drain pipes 105 having a controlling valve 106ª, pass through a side wall of the curing chamber and above the level of the steam pipe 104 and are adapted to drain off any water within the pit 102 which rises above a certain level within the steam chest. Another drain pipe 105ª, having a trap 106 and a valve 106ª, is connected to the bottom of the pit whereby the pit may be completely drained of water. Traps 106 are connected with the drain pipes 105 and 105ª to prevent the escape of steam from the chest through the drain pipes.

The valves in the several drain pipes permit the closing of one of the other pipes when water is being drained from the pit by one pipe. The drain pipes may be preferably located centrally of the length of the curing chamber.

Spaced along the longitudinal side walls 101 of the steam chest are formed openings which are closed by slabs 107 of concrete, having their peripheral edges beveled and in engagement with a packing 108 to prevent the steam from escaping. Metal plates 109 engage the outer faces of the slabs 107 and are held in place by means of bolts 110, which go clear through walls of concrete forming the sides of the steam chest, with their threaded ends projecting outwardly from the walls 101 and passing through perforations in the plates 109. Nuts engage the threaded ends of the bolts 110 to maintain the plates 109 and the slabs 107 in position.

These removable slabs 107 serve as closures providing access to the interior of the steam chest, whereby it is possible for a workman to enter the steam chest when it is necessary to make repairs or for some other useful purpose. The steam chests are supported by pairs of spaced legs 111, which are located at intervals throughout the length of the steam chest, and supported upon the ground or floor 1 of the brick making shed.

As the heated molds with the cured bricks pass from the steam chest, after several hours of steaming, the bases of the molds are sprayed by some cold fluid such as oil, through a pipe 112 having a nozzle 112ª, in order to cool and thereby contract the cores. (Fig. 2.) The cured bricks may then be readily removed from the contracted molds. A trough 113 is located adjacent the upper edge of the pipe 112 to catch the spent fluid which drops off the bottoms of the molds after being sprayed. A pipe 114 returns the warm fluid to a cooling means. Oil is preferred because it will not rust the molds.

A drip pan 115 is located below the spaced sprockets 17 so that any fluid not caught by the drip pan 113 will find its way into the pan 115 and be carried by a pipe 116 to the cooling station.

In the case of hollow bricks, the fluid is sprayed into the open bottom of the cores 52 of the molds, whereby the total area of the core is reached by the fluid and thereby cooled and contracted from the bricks.

As shown in Fig. 15, which shows the molds for forming solid bricks, the spaces 92 between the sides 91 of the molds, when the molds are in the steam chest, permits steam to circulate in these spaces, thereby accelerating the hardening and curing of the product.

At the forward end of the brick or block making machine, and beneath the spaced sprockets 10, is another drip pan 117, which is adapted to receive fluid dropping from the molds and the sprockets 10 and the chain 11, the fluid being sprayed onto the inner sides of the molds by means of a tube 118 for the purpose of preventing concrete sticking to molds. A pipe 119 carries the drained fluid back to a reservoir from whence it has been pumped.

Referring to Fig. 2, a picking or unloading mechanism 88, which is mounted upon a carriage 120 provided with wheels 121 to ride on rails 122, carries a motor 123 that is adapted to be rotated in synchronism with the movement of the traveling carrier; that is, to produce about twelve actuations of the mechanism per minute, so that said mechanism will engage the cured bricks at the proper time, since about twelve rows of bricks pass before the picking mechanism per minute. The speed may be increased or diminished as desired. The rails are laid transversely at the discharge or rear end of the machine, or series of machines.

The motor 123 operates the large gear 124 and pinion 126, which in turn meshes with a gear 126. A pulley 127 is mounted on the shaft which carries the gear 126, and drives an endless belt 128, which in turn drives another pulley 129. On the shaft upon which the pulley 129 is located is mounted a pulley 130, driving an endless belt 131, which in turn drives a pulley 132, mounted on a shaft 133.

The shaft 133 is rotatable in bearings upon a frame 134, which rises from a table 135, secured to the carriage 120.

A pulley 136 is driven by an endless belt 137 which in turn is driven by a pulley 138 mounted on the same shaft 133 with the pulley 132.

The pulley 136 is mounted on a shaft 139, carrying a pair of cam members 140, which are oppositely disposed, and engage the weighted arms 141 of rock levers 142, pivotally mounted at 143 upon the frame 134. The cams 140 are adapted to raise the weighted arms 141 until the enlarged portion 144 on each arm 141 passes the high portion of the cams, when the arms 141, by reason of the weights 145, will cause the arms 141 to descend, and thereby rock the levers 142 to the right, as indicated by the arrows in Fig. 2.

As the arms 142 are moved towards the right, they actuate the supporting rods 147 for the picker or unloading mechanism 148, the jaws 149 of which are in gripping engagement with the cured bricks 79. The jaws will pick the bricks from the cores 52 of the molds and carry them to the right, until the tripping mechanism 150 strikes the adjustable roller 151, when the jaws are released, and the brick is deposited upon the traveling belt 152, which is driven by a roller 153 mounted on the shaft 133.

About the time that the brick has been deposited from the picking or unloading mechanism 148, the cams 140 engage the portions 144 of the weighted arms 141, whereby the supporting rods 147 are swung to the left by the rocker arms 142, and the jaws 149 will engage the bricks again in the next row of molds.

As shown in Figs. 2 and 6, a shaft 186 is driven by intermeshing gears 187 and 188. Gear 188 is mounted on a shaft 189, which is driven through a pulley 190 and an endless belt 191, the belt being driven by a pulley on the shaft 139. The shaft 186 is provided with spaced cranks 192, which are connected to the supporting rods 147 of the picker mechanism, so that said rods will be drawn upwardly and away from the mold, after the fingers 149 have gripped the cured brick. Slidable sleeves 147$^a$ are carried along the arms 147 by the levers 142 to cause the fingers 149 to grip the bricks, or to release the bricks at the proper moment. The periodic movements of the cranks 192 cause the arms 147, and likewise the jaws 149, to be directed towards the brick in the molds, as the sleeves 147$^a$ are moved downwardly along the arms and thereby open said fingers or jaws in readiness to engage the oncoming bricks from which the sides of the mold have been released.

The inner ends of side bars 154 of the curved gravity roller carriage are pivotally mounted on the shaft 133, (Fig. 6), on opposite sides of the roller 153, and are provided with spaced rollers 155, the free end 156 of the side bars 154 being adapted to be placed upon and supported by an inclined gravity roller or power belt conveyer 157, which is extended transversely beyond the ends of the brick making machine. Bricks or blocks which have been deposited upon the traveling belt 152 by the picker mechanism are carried upwardly and outwardly by the belt to the gravity roller carriage and deposited thereon, said gravity roller carriage carrying the blocks downwardly on the gravity rollers 155 until they reach the end 156, where they will drop upon the roller or power belt conveyer 157, and are carried to another part of the brick-making plant or shed. One end of the main gravity roller conveyer 157 is elevated by means of a frame or scaffolding 158, which is located in alinement with the end of the first brick-making machine.

When solid bricks are manufactured, the picking or unloading mechanism and the corrugated spring 87 are dispensed with. Referring to Figs. 8 and 9, a guard 159, which is curved concentrically to the driven sprockets 17, is spaced from the molds and and maintained in position by a bracket 160 mounted upon the beam 14 at the rear end of the brick-making machine, so that as the molds containing the solid bricks pass around the driven sprockets 17, the guard 159 will maintain the bricks within the molds and prevent them dropping out, until the molds reach a point which is adjacent to one end of an endless belt 161, driven by a pulley 162 mounted at the most elevated point and at one end of a frame 163 mounted upon a carriage 164.

The carriage is provided with wheels 165 riding upon rails 166. A motor 167 drives a plurality of intermeshing gears, which in turn drive a pulley 168, which connects by an endless belt 169 with the pulley 162. At the lower and forward end of the frame is mounted a pulley 170 mounted in adjustable bearings over which the endless belt 161 moves.

As the solid bricks 171 drop upon the endless belt 161, they are carried upwardly by said belt, and deposited upon a gravity roller carriage 172, pivotally mounted at its inner end on shaft 173 upon which the pulley 162 and the driving roller 174 are mounted. The outer end 175 of the gravity roller carriage is adapted to be placed upon a roller conveyer 157 similar to the conveyer shown in Fig. 6, and previously described, said conveyer being supported by a frame 158; so that the bricks moving down the gravity roller carriage 172, are deposited upon the roller conveyer 157, and carried to some other part of the brick making shed or plant.

While I have described a single brick making machine in which are included a number of co-related devices forming a continuous operation in the manufacture of bricks, as heretofore stated, I propose, where a very large output is required, to construct a battery of machines comprising a plurality of these brick making machines disposed side by side, having all the traveling mold carriers operated by a single continuous shaft 16; clutches 177 on the shafts individual to the driving sprockets for the mold carriers; a single hopper common to all the machines movable transversely of the battery of brick making machines for filling the molds of the traveling carrier; individual steam chests for curing the green bricks; and in the case where hollow bricks are formed, a single take-off or unloading mechanism common to all the machines for picking the cured bricks from the molds as they pass from the individual steam chests, the picker mechanism being movable on tracks located beyond the end of the battery of brick making machines; and a single gravity roller carriage for receiving the bricks from the picker or unloading mechanism. When solid bricks are manufactured, a single traveling carriage provided with a receiving belt for the cured bricks that are dumped from the molds, is employed, said carriage being movable on tracks adjacent the end of the battery of molds.

Six molds for forming hollow bricks are employed in a row of at least 250 rows on the endless mold carrier, the 250 rows or more comprising but a portion of the endless traveling carrier, and which portion of the carrier is slightly shorter than the length of the steam chest so that when the molds are run into the steam chest, the doors of said chest may be closed to confine the molds in the chest. Ten molds are employed in a row with at least 250 rows for forming solid bricks.

The operation of my device is as follows:—

The clutch 177 is operated by a rod 178 having a handle 179 which is located adjacent the forward end of each brick-making machine of the battery, (Figs. 3 and 5), and in a position where it may be conveniently reached by the operator. As the rod 178 is shoved inwardly, the bell crank lever 180 is operated to move the clutch 177 in engagement, whereby the driving sprockets 17 of the first machine of the series are operated. As the traveling carrier 11 is moved, the first rows of molds will be brought beneath the sleeve 47 of the hopper 32, the rollers 49 and 50 will close the latches 77, while the sides of the molds will be held in alinement while being filled.

The hopper 31, which has been filled with a normal consistency concrete, starts filling the rows of molds beneath the sleeve 47, whereupon motor 34 is operated at a speed which will drive the cams 38 about 100 revolutions per minute, and thereby oscillate the levers 41 and the arms 45 and raise the rails 20, the molds 33, the frame 48, and the sleeve 47, so that the concrete being filled into said molds from the hopper 31 will not only be jarred and rammed, but will be firmly pressed within the molds 33 by the rollers 49, 50. In addition to this, the weight of the concrete within the hopper 31 and sleeve 47, which is caused to rise and fall, exerts a ramming and pressing action on the material within the molds. The molds 33 are constantly in motion and are kept moving towards the entrance of the steam chest 23 at the rate of at least eight feet a minute, or in other words, at least twelve rows of molds pass beneath the hopper per minute.

So far as I am aware, it is novel in this art to subject the molds to a jarring action simultaneously with the filling of the molds, and at the same time, utilize the weight of the concrete in the hopper as a ram to increase the compacting of the concrete in the molds.

As previously stated, the jarring of the molds is greatest beneath the hopper, and it diminishes in degree until the molds reach the steam chest, where it wholly ceases. This is also a novel feature of this invention.

The filling operation is continued until the last mold which is near the connecting end 33ª of the carrier 11 is filled. The carriage 28 is then moved along the rails 30 until the hopper 31 is placed above another machine of the battery or over the first two rows of molds of said section, and the operation is resumed. Before moving the carriage 28, the jigging arms 45 are released from rails 20 and folded back upon links 44.

When all the molds have passed within the steam chest 23, both gravity-operated doors 98 and 99 are dropped to close the same, and steam is turned on through the perforated feed pipe 104, and the green bricks within the molds are left to a curing process for several hours. While the bricks in the first machine are being cured, the molds of adjacent machines are filled and run into their respective steam chests to be cured.

As I employ several of said machines to form a battery, at about the time that the molds of the last machine of the battery have been filled with concrete and run into its individual steam chest, the bricks of the first machine are cured and ready to be removed. Nevertheless, the filling of the other machines will take just sufficient time that about half an hour before the last machine has been completely filled, the driving sprockets of the first machine may be started to remove the molds from the steam chest.

A cold fluid through the feed pipe 112 is sprayed upon the bases of the molds and into the hollow cores 52, to cool the cores and contract them so that the cured hollow bricks may be readily picked from the molds by the take-off mechanism 88. As the bricks are picked out of the molds by the take-off mechanism, or dropped out as in the case of solid bricks, the carrier 11, with the molds, continues its travel around the driving sprockets 17 and beneath the steam chest, then forwardly to its initial position beneath the filling hopper 31, which has been returned on tracks 30 to the first machine after it has filled the molds of the last machine of the battery. To prevent sticking, the molds are sprayed on their inner sides with a lubricating fluid just before reaching the sprockets 10, the surplus draining off insides of molds to pan 117.

It will be understood that by the time the molds of the first machine have reached the forward end of the first machine of the battery, sufficient time will have elapsed for the complete filling of the molds of the last machine and the return of the hopper to the first machine.

It will be seen that it is possible by my improved battery of brick making machines to provide a continuous operation of all the machines in succession, and that by employing three shifts of men of eight hours each, each group of men will operate one complete battery. In twenty-four hours the battery may be re-filled and emptied three times. As the bricks are removed, either by the take-off mechanism 88 in the case of hollow bricks, or by the endless traveling carrier 161 shown in Fig. 8, for solid bricks, the bricks in either case are deposited upon a common gravity roller or belt conveyer and then carried to some other part of the brick making plant for storage or removal.

So far as I am aware, it is broadly new in brick or block making machines to provide for the continuous filling of the molds and the continuous jarring of the same while the molds are filled, the jarring action gradually diminishing from the time the molds are filled until the steam chest is entered. By the arrangement of the hopper, the shield, the rollers and the traveling carrier with the molds, when the rails are raised by the jigging mechanism, the molds, the arm carrying the rollers, and the shield are all simultaneously raised, and since the concrete material is contained within the shield and rests upon the material in the mold, it naturally follows that not only the material in the molds, but the material in the hopper, are raised and dropped in harmony with the movements of the jigging mechanism. All the while the concrete is damp, plastic, and when the molds, with the material, enter the steam chest, the material is still plastic. It will be understood, of course, that not until the last mold has entered the steam chest does the jarring cease, so that all the molds are subjected to the same jarring and ramming action which is quite severe at first, but gradually decreases to a slight movement until the steam chest is reached. This operation results in the production of bricks or blocks having great density and strength and a corresponding improvement in the product.

Another feature of importance is that the side walls 58 and 60 of the molds are higher than the cross division plates 73 (see Fig. 14), so that the notched or slotted sleeve 47 of the hopper also rollers 49 and 50, engage with the upper ends of the side walls, maintaining them in proper shape, so that they may not move sidewise, which results in producing blocks which are true to shape and size. Said sleeve also acts as a strike-off at rear side, cutting off surplus concrete and keeping same within hopper and sleeve.

As shown more particularly in Fig. 20, a filler 194, which may be of wood or any suitable material, is bolted to the inside of the upper edge of the entrance of the curing chamber 23, having its lower edge beveled to engage the upper edge of the door 98 when said door is closed. The lower edge of the door is likewise beveled so that said edge will lie in flat engagement upon the portion 196, built up from the floor of the chamber at the entrance to said chamber and constructed of any suitable material. Side cleats or ledges 197 are provided for the door to abut against in order to more thoroughly seal the door when closed.

From the bottom edge of the doors 98 and 99 extend upwardly a pair of spaced slots through which the spaced rails 26 extend when the doors are in closed position. The slots are just wide enough to fit the rails, without binding, to prevent the escape of steam at these points. The construction and mounting of door 99 is similar to the mounting and construction of door 98.

Heavy hinges 198 are secured to end walls of the curing chamber 23 for supporting the doors 98 and 99 in swinging position, the securing bolts for the hinges passing through the filler 194 and the end wall.

When the bases of a row of molds are flexed by the transverse member 66, as shown in Figs. 14 and 15, the end sides of a row of molds will swing upon the pivot point 64, and which I consider the "neutral point". The neutral point is that exact point between the upper and lower edges of the end sides of the molds at which said end sides must be pivoted in order that the lower edges of the end sides of the mold will swing inwardly towards each other just a proper distance to permit the bases of a row of molds to flex sufficiently to meet the curvature of the crowned upper edges of the transverse bars 86. In other words, as the upper edges of the end sides of the molds travel outwardly, the lower edges of said end sides travel inwardly, but not nearly so far, because the top edges require a much greater travel. The positioning of the hinge pin 64 is important and should be placed at the neutral point to prevent any strains on the links of the traveling carrier and its related parts when the bases of a row of molds are flexed by the crowned bars 86.

Where a very large output is required, I use a series of machines, as has been explained, but in communities which could not absorb a very large output, I propose to use one machine of either the hollow or solid brick type, or both kinds, if desired, placing upon said single machine a full equipment of molds; that is, the endless chain having every link fitted with a row of molds. A hopper is installed over the molds in the same manner as in the series machine, but is a stationary instead of a traveling type. The unloading device is permanently installed at the rear end of the machine. This single machine may be operated continuously if required, there being three shifts of workmen employed every twenty-four hours, as in the case of a battery of machines.

In the single machine type, the length of the curing chamber would be necessarily extended and the mold carrier run at a slower rate of speed, so that the bricks would have several hours of curing while passing through the chamber. In other words, it would require several hours for filled molds to pass through the curing chamber and out at the rear end of the same where the cured bricks will be unloaded. A continuous operation will therefore be had in this manner with a single machine, as has been explained in reference to a battery of machines. In the single machine, if necessary, a motor may be employed at each end to drive the sprockets and these motors will therefore be driven synchronously.

Where a single machine is used, the doors 98, 99 will be entirely unnecessary, and therefore I propose to employ a filler at each end of the curing chamber which will fit as neatly as possible about the traveling carrier, the rails and the molds, without causing friction between these moving elements and the filler or wear on the same, but which will prevent loss of steam from the curing chamber. This filler will extend for several feet lengthwise of the chamber and inwardly from each end of the same so that the ends of cross division plates will come in contact with this extended filler at many places at the same time, thus having the same effect as though the molds and carrier had smooth even sides. The filler may be made of wood or some composition and contacts with so many molds at the same time as to seal the curing chamber from the atmosphere to a very fair degree and without causing any undue wear on the molds.

As shown in Fig. 19, the upper portion 199 of the filler is provided with notches 200 through which the intermediate sides and the end sides of the molds will pass. The lower portion 201 of the filler is provided with grooves 202 in which are inserted the rails 26 and through which, likewise, the wheels of the traveling carrier pass. Side portions 203 of the filler engage the cross division plates as the molds travel through the entrance. The outer end of the filler is beveled, as shown at 204, at the point where the molds and traveling carrier enter the filler so that no abrupt edges will appear and cause injury to the molds of the traveling carrier.

In practice, I employ a roller on the inner face of the rear door 99, which is similar to the roller 49ª on the front door 98, and which is adapted to revolve on the tops of the molds to prevent undue wear and friction on the door and molds as the molds pass out of the curing chamber 23. This roller has no manufacturer's imprint. The roller is adapted to engage the dummy mounted on the traveling carrier in advance of the first row of molds, so that the roller will revolve as it slides on the inclined surface of the dummy when the door is being opened by the moving molds.

When using a single machine, the jigging mechanism connected with the hopper may be located underneath the track upon which the molds travel instead of upon the hopper frame.

What is claimed, is:—

1. In a machine for making concrete blocks, a traveling carrier having molds, a hopper mounted above the molds and adapted to fill the same, means for jarring and ramming the concrete in the molds, a closed chamber into which the traveling carrier with the molds are admitted for curing the blocks, means for supplying the chamber with steam, means for causing the contraction of the molds after leaving said chamber, and means for picking the cured bricks from the open molds of the traveling carrier.

2. In a machine for making concrete blocks, an endless traveling carrier provided with a plurality of molds, a hopper mounted above the carrier for filling the molds, and means adapted to periodically raise and suddenly drop a portion of the traveling carrier and the molds simultaneuosly with the filling of the molds.

3. In a machine for making concrete blocks, an endless traveling carrier provided with a plurality of molds, a hopper mounted above the traveling carrier for filling the molds, the latter being arranged below the bottom of the hopper, and means associated with the hopper and adapted to periodically raise and suddenly drop a portion of the traveling carrier and the molds connected therewith simultaneously with the filling of the molds, said means being adapted to elevate and drop the filling material in the hopper at the same time.

4. In a machine for making concrete blocks, an endless traveling carrier provided with a plurality of rows of molds, a hopper mounted above the traveling carrier for filling the molds with concrete, means adapted to periodically raise and suddenly drop a portion of the traveling carrier and the molds connected therewith, and a sleeve slidably mounted on the bottom of the hopper and adapted to embrace a plurality of rows of molds.

5. In a machine for making concrete blocks, an endless traveling carrier provided with a plurality of rows of molds, a hopper mounted above the traveling carrier for filling the molds with concrete, means adapted to periodically raise and suddenly drop a portion of the traveling carrier and the molds connected therewith, and a sleeve slidably mounted on the bottom of the hopper and adapted to embrace a plurality of rows of molds, said sleeve being adapted to rest upon the top of the molds and provided with a plurality of notches to receive certain of the walls of the molds.

6. In a machine for making concrete blocks, an endless traveling carrier provided with a plurality of rows of molds, a hopper mounted above the traveling carrier for filling the molds with concrete, and a sleeve slidably mounted on and surrounding the bottom portion of the hopper and adapted to embrace a plurality of rows of molds.

7. In a machine for making concrete blocks, an endless traveling carrier provided with a plurality of rows of molds, a hopper mounted above the traveling carrier for filling the molds with concrete, and a sleeve slidably mounted on the bottom of the hopper and adapted to embrace a plurality of rows of molds, said sleeve telescoping the bottom of the hopper and having its lower edge formed with a plurality of notches to engage certain of the walls of the molds to aline the same.

8. In a machine for making concrete blocks, an endless traveling carrier provided with a plurality of rows of molds, a hopper mounted above the traveling carrier for filling the molds with concrete, and a sleeve slidably mounted on the bottom of the hopper and adapted to embrace a plurality of rows of molds, said sleeve being provided with a frame carrying rollers to bear upon the top of the concrete in the molds.

9. In a machine for making concrete blocks, an endless traveling carrier provided with a plurality of rows of molds, a hopper mounted above the traveling carrier for filling the molds with concrete, and a sleeve slidably mounted on the bottom of the hopper and adapted to embrace a plurality of rows of molds, said sleeve being provided with a frame carrying rollers to bear upon the top of the concrete in the molds, and said rollers being provided with spaced grooves.

10. In a machine for making concrete blocks, an endless traveling carrier provided with a plurality of rows of molds, a hopper mounted above the traveling carrier for filling the molds with concrete, a sleeve slidably mounted on the bottom of the hopper and adapted to embrace a plurality of rows of molds, said sleeve telescoping the bottom of the hopper and having its lower edge formed with a plurality of notches to engage certain of the walls of the molds to aline the same, and a frame carrying grooved rollers provided on said sleeve.

11. In a machine for making concrete blocks, the combination with an endless traveling carrier provided with a plurality of molds, a hopper mounted above the carrier for filling the molds with concrete, a sleeve telescoping the bottom of the hopper, and means for supporting a pair of rollers in front and in rear of the sleeve, said rollers being movable with the sleeve and normally resting upon the concrete filling of the molds.

12. In a machine for making concrete blocks, the combination of an endless traveling carrier provided with a plurality of molds, a hopper mounted above the carrier for filling the molds with concrete, a sleeve telescoping the bottom of the hopper and provided at its lower edge with a plurality of notches to receive the upper edges of the walls of the mold, and a pair of rollers connected to the sleeve and movable therewith and arranged one in front and one in rear of the sleeve, said rollers being provided with spaced grooves which are alined with the notches in the sleeve and which also engage the walls of the molds.

13. In a machine for making concrete blocks, the combination with an endless traveling carrier provided with a plurality of rows of molds, a frame provided with a pair of spaced rollers arranged one in advance of the other, said rollers being slidably connected with the bottom of the hopper so as to have vertical movement, said rollers having spaced grooves to accord with the spacing of the partitions of the molds, and said rollers resting upon the tops of the molds and acting to press and even off the material into the molds.

14. In a machine for making concrete blocks, an endless traveling carrier provided with a plurality of rows of molds, a hopper mounted above the traveling carrier for filling the molds with concrete, means adapted to periodically raise and suddenly drop a portion of the traveling carrier and molds connected therewith, and a sleeve slidably mounted on the hopper between the latter and the molds and adapted to embrace a plurality of rows of molds so as to provide means cooperating with the hopper to properly direct concrete into the molds, said sleeve being adapted to be raised and lowered in harmony with the raising and lowering of the carrier and the molds and holding a mass of concrete directly upon the concrete in the molds.

15. In a machine for making concrete blocks, a traveling carrier provided with a plurality of molds, a hopper mounted transversely of the traveling carrier for filling the mold with concrete, rails having a movable section on which said carrier travels, means adapted to periodically raise and suddenly drop the movable section of the rails, the traveling carrier and the molds connected therewith, a vertically movable sleeve slidably mounted in the space between the hopper and the molds and adapted to embrace a plurality of molds and provide means for cooperating with the hopper to properly direct concrete into the molds, said sleeve being movable with the molds.

16. In a machine for making concrete blocks, a traveling carrier provided with a plurality of molds, a hopper mounted transversely of the traveling carrier for filling the molds with concrete, rails having a movable section on which said carrier travels, and means adapted to periodically raise and suddenly drop the movable section of the rails, the traveling carrier and the molds connected therewith.

17. In a machine for making concrete blocks, a traveling carrier provided with a plurality of molds, a hopper mounted transversely of the traveling carrier for filling the molds with concrete, means adapted to periodically raise and suddenly drop a portion of the traveling carrier and molds connected therewith, a sleeve slidably mounted between the hopper and the molds and adapted to embrace a plurality of molds to provide means cooperating with the hopper to properly direct concrete into the molds, and rollers rotatably mounted on the sleeve for removing excess concrete at the tops of the molds.

18. In a machine for making concrete blocks, a traveling carrier provided with molds, a hopper mounted transversely of the molds, rails on which the carrier travels, each rail provided with a movable section, and means for periodically raising and suddenly dropping the movable rail sections, the traveling carrier and the molds, comprising a lever, a cam engaging the lever to oscillate the same, a link pivotally connected to the lever, an arm connected with the link and adapted to engage the movable rail section for raising the same when the lever is engaged by the cam, and means for operating the cam.

19. In a machine for making concrete blocks, a traveling carrier provided with molds, a hopper mounted transversely of the molds, rails on which the carrier travels, each rail provided with a pivoted section, and means for periodically raising the rail sections, the traveling carrier and the molds and then suddenly dropping the same, comprising a pair of levers pivotally mounted intermediate their ends, cams engageable with one end of the levers, links pivotally connected at the other end of the levers, depending arms pivotally connected with the links and adapted to engage the rail sections for raising the same when the free ends of the levers are engaged by the cams, said arms being adapted to be disengaged from the rails and folded back upon the link when said hopper is moved away from the molds.

20. In a machine for making concrete blocks, the combination with a traveling carrier having molds, rails on which said carrier travels, said rails each having a pivoted section, a hopper above the molds, rails on which said hopper is movably mounted, and means carried by the hopper for jarring the molds.

21. In a machine for making concrete blocks, a hopper, a carriage in which said hopper is mounted, rails on which said carriage is adapted to travel, and jarring means mounted on the carriage and movable therewith.

22. In a machine for making concrete blocks, the combination with a traveling carrier provided with molds, of a hopper above the carrier and the molds, a carriage on which said hopper is mounted, pivoted arms depending from the carriage, and means mounted on the carriage for oscillating said arms.

23. In a machine for making concrete blocks, the combination with the traveling molds, of a hopper for discharging into the same, and means for jarring the molds while being filled, said jarring continuing with diminishing force after the molds leave the region of the hopper.

24. In a machine for making concrete blocks, the combination with the traveling molds, of a hopper above the molds and discharging into the same, a curing chamber into which the molds are moved, and means for jarring the molds while being filled from the hopper and also while traveling to the curing chamber, the jarring of the molds under the hopper being of greater intensity than away from the hopper.

25. In a machine for making concrete blocks, the combination with the traveling molds, of a hopper discharging into the molds, a steam chest into which the molds are received after being filled, and means for jarring the molds while being filled and until they reach the steam chest, the jarring diminishing in force from the hopper to the steam chest.

26. In a machine for making concrete blocks, the combination with rails, each having a section pivoted at the rear end, of a carrier traveling along the rails, molds provided on the carrier, a hopper mounted above the carrier and molds near the forward end, and means connected to the pivoted sections of the rails for jarring the carrier.

27. In a machine for making concrete blocks, the combination with rails, each having a section pivoted at the rear end, an anvil supporting the pivoted sections of the rails remote from the pivoted ends, of a carrier traveling along the rails, molds provided on the carrier, a hopper mounted above the carrier and molds near the forward end, and means connected to the pivoted sections of the rails adjacent to the anvil for jarring the carrier.

28. In a machine for making concrete blocks, the combination with rails, each having a section pivoted at the rear end, of a steam chest, rails mounted in the steam chest, and extending from the rear end of the latter and alined with the first-mentioned rails, a traveling carrier with molds having wheels to travel on said rails, means for filling the molds, an anvil below the pivoted sections of the rails for supporting the same, said anvil being located remote from the pivoted ends of said rails, and means connected to the pivoted rails adjacent the anvil for raising and lowering the same and producing a jarring action on the molds.

29. In a machine for making concrete blocks, a traveling carrier provided with a plurality of rows of molds, and means for moving the traveling carrier, the molds being each provided with a hollow core with sides secured thereto and extending longitudinally of the traveling carrier, the adjacent sides of the molds in each row being rigidly secured together.

30. In a machine for making concrete blocks, a traveling carrier provided with a plurality of rows of molds, and means for moving the traveling carrier, the molds being each formed of a hollow core with a flange at the base of the core, and longitudinal vertical sides which are abutted and secured together forming a side which is common to adjacent molds.

31. In a machine for making concrete blocks, a traveling carrier provided with a plurality of rows of molds, the sides of adjacent molds being connected together at the base to provide a common intermediate side extending longitudinally of the traveling carrier, and the outer sides of the molds at the end of each row being pivoted to the carrier.

32. In a machine for making concrete blocks, a traveling carrier provided with a plurality of rows of molds, said carrier being formed of channel-shaped links pivotally connected together, wheels mounted in said links, the axles of said wheels constituting the pivotal connections of said links, said molds having their intermediate sides connected together and extending longitudinally of the carrier, and the outer sides of the molds at the end of each row pivotally connected to the said links.

33. In a machine for making concrete blocks, a traveling carrier provided with rows of molds, said carrier being formed of channel-shaped links at each side, wheels pivotally mounted within the links at the ends thereof, the axles for said wheels constituting the pivotal connections between the links, U-shaped supports embracing the links and also pivotally connected to the axles of the wheels, cross division plates rigidly connected to the U-shaped supports, and forming the transverse divisions between the rows, and molds arranged in rows, the ends of each row being pivotally connected to said links between the cross division plates.

34. In a machine for making concrete blocks, a traveling carrier provided with rows of molds, said carrier being formed of channel-shaped links at each side, wheels pivotally mounted within the links at the ends thereof, the axles for said wheels constituting the pivotal connections between the links, U-shaped supports embracing the links and also pivotally connected to the axles of the wheels, cross division plates rigidly connected to the U-shaped supports and forming the transverse divisions between the rows, said plates having outwardly-disposed bases which together with the U-shaped supports form a protective covering for the wheels, and molds arranged in rows, the ends of each row being pivotally connected to said links between the cross division plates.

35. In a machine for making concrete blocks, a traveling carrier formed of pivotally connected links arranged longitudinally at each side, wheels mounted in the links, the axles for said wheels constituting the pivotal connections between the links. U-shaped supports embracing the links at the pivotal connections and also pivotally connected to the axles of the wheels, transverse rows of molds having their ends pivotally connected to the links, cross division plates rigidly connected to said supports and forming the transverse divisions between the rows, the molds forming each row having the sides of adjacent molds connected together.

36. In a machine for making concrete blocks, a traveling carrier provided with rows of molds, a cross division plate forming a transverse division between the adjacent ends of a pair of rows of molds, a plurality of longitudinal sides each forming a common intermediate side for adjacent molds in a row, said transverse divisions and longitudinal sides being flexibly mounted on the traveling carrier, whereby they may be released from the blocks formed in the molds.

37. In a machine for making concrete blocks, a traveling carrier provided with rows of molds, and a cross division plate forming a common transverse partition for the adjacent ends of each pair of rows of molds, said plate being loosely pivoted to the carrier.

38. In a machine for making concrete blocks, a traveling carrier provided with rows of molds, a flexibly mounted cross division plate forming a common transverse division for the adjacent ends of a pair of rows of molds, and latching mechanism connecting the cross division plates to the adjacent rows of molds.

39. In a machine for making concrete blocks, a traveling carrier provided with rows of molds which are flexibly connected at the ends of each row to the carrier, sprocket wheels, and bars mounted on and connecting the sprocket wheels and having their outer edges curved to flex or bend the rows transversely of the sprocket wheels as the carrier passes around the same.

40. In a machine for making concrete blocks, a traveling carrier provided with rows of molds, cross division plates forming partitions between each transverse row and also forming the end walls of the row of molds, said plates being pivotally connected to the carrier, latching mechanism carried by each row of molds to engage with the cross division plates, and means for releasing the latching mechanism so that the cross division plates may become separated from the ends of the blocks in the molds.

41. In a machine for making concrete blocks, a traveling carrier provided with rows of molds, the ends of each row being pivotally connected to the carrier, cross division plates also pivotally connected to the carrier and forming the ends between each adjacent row, latching mechanism for holding the cross division plates to the molds, front and rear sprocket wheels for the traveling carrier and unlatching means located adjacent to the rear sprocket wheels to release the latching mechanism and allow the cross division plates to become separated from the formed blocks in the molds as the carrier passes around the sprocket wheels.

42. In a machine for making concrete blocks, a traveling carrier provided with rows of molds which are flexibly connected transversely, latching mechanism to connect each row of molds to the adjacent rows of molds, and means for releasing the latching mechanism to allow the molds to flex transversely.

43. In a machine for making concrete blocks, a traveling carrier provided with rows of molds, cross division plates pivotally connected to the carrier, latching means for connecting the cross division plates to adjacent rows so that they constitute the ends of the molds, and means located in the path of the traveling carrier to actuate the latching means to release the same and allow the molds to flex and the cross division plates to become separated from the ends of the blocks.

44. In a machine for making concrete blocks, a traveling carrier provided with rows of molds, a cross division plate forming a common transverse division for the adjacent ends of a pair of rows of molds, said molds having their intermediate sides extending longitudinally of the traveling carrier and each connected to form a common side for adjacent molds in a row, said transverse divisions and intermediate sides being flexibly mounted on the traveling carrier whereby they are releasable from the bricks formed in the mold, and end sides located at the opposite ends of each row, and means for pivoting the end sides to the carrier.

45. In a machine for making concrete blocks, a traveling carrier provided with rows of molds, a cross division plate forming a common transverse partition for the adjacent ends of a pair of rows of molds, said molds having their intermediate sides connected to form a common side for adjacent molds in a row, said cross division plates being pivotally mounted at their opposite ends to the traveling carrier, and the end sides of said molds being flexibly connected to said carrier and latching mechanism between the cross division plate and the molds.

46. In a machine for making concrete blocks, a traveling carrier provided with rows of molds, a cross division plate forming a common transverse end for the adjacent ends of pair of rows of molds, said plate being pivotally connected to the carrier, said molds having their intermediate sides connected to form a common side for adjacent molds of a row, end sides located at the opposite ends of each row, the cross division plate being provided with end slots, and latches provided on the end sides and adapted to engage the slots for locking the end sides in longitudinal alinement and also holding the cross division plate in normal position.

47. In a machine for making concrete blocks, a traveling carrier provided with rows of molds, cross division plates each forming a common transverse partition for the adjacent ends of a pair of rows of molds, said plates being pivotally connected to the carrier, the cross division plates being provided with slots, latches provided on the ends of each row and adapted to engage the slots for locking the rows and division plates to each other, and means located in the path of movement of the carrier for automatically releasing the latches.

48. In a machine for making concrete blocks, a traveling carrier provided with rows of molds, cross division plates each forming a common transverse partition for the adjacent ends of a pair of rows of molds, said plates being pivotally connected to the carrier, latching mechanism between the rows of molds and the cross division plates, means for releasing the latching mechanism, and a separate means to engage the cross division plates to temporarily retain the latter in position.

49. In a machine for making concrete blocks, a traveling carrier provided with rows of molds, cross division plates each forming a common transverse partition for the adjacent ends of a pair of rows of molds, said plates being pivotally connected to the carrier, latching mechanism between the rows of molds and the cross division plates, front and rear sprocket wheels around which the carrier is passed, means located adjacent to the rear sprocket wheels for releasing the latching mechanism, and a separate means located in rear of the said releasing means to engage the cross division plates and temporarily retain them against the blocks in the molds as the carrier begins its travel around the sprocket wheels.

50. In a machine for making concrete blocks, a traveling carrier provided with rows of molds, a cross division plate forming a common transverse end for the adjacent ends of a pair of rows of molds, a plurality of longitudinal sides each forming a common intermediate side for adjacent molds in a row, said transverse end and longitudinal sides being flexibly mounted on the traveling carrier whereby they are releasable from the bricks formed in the mold, other longitudinal sides located at the opposite ends of each row, means for automatically locking the last-mentioned sides in alinement, and means for automatically releasing said locking means.

51. In a machine for making concrete blocks, a traveling carrier provided with rows of molds, cross division plates, each plate being pivotally connected to the carrier and forming a common transverse partition for the adjacent ends of a pair of rows of molds, latching mechanism between the rows of molds and the cross division plates, means located in the path of movement of the carrier for releasing the latching mechanism, and means for automatically forcing the latching mechanism into reengagement when the traveling carrier has moved to another point in its travel.

52. In a machine for making concrete blocks, a traveling carrier provided with rows of molds, cross division plates flexibly mounted on the carrier and forming a common transverse end for the adjacent pairs of rows of molds, a plurality of longitudinal sides forming intermediate sides for adjacent molds in each row, other longitudinal sides for the end molds of the rows flexibly mounted on the traveling carrier, the sides of the molds extending above the cross division plates, a hopper for filling the molds, a sleeve slidably mounted on the hopper and provided at its lower edges with notches to receive the extended upper ends of the side walls of the molds so as to keep said side walls in proper place and insure making a product of correct shape and size.

53. In a machine for making concrete blocks, a traveling carrier provided with molds having flexible sides and flexible ends, a hopper for filling the molds, and a vertically movable sleeve provided at the bottom of the hopper between the latter and the molds, said sleeve having means to engage the sides of the molds to keep them in their proper positions.

54. In a machine for making concrete blocks, a traveling carrier provided with molds having flexible sides and flexible ends, a hopper for filling the molds, a vertically movable sleeve provided at the bottom of the hopper between the latter and the molds, said sleeve having means to engage the sides of the molds to keep them in their proper positions, and means provided on the adjacent rows of molds to engage the flexible ends to maintain them in their proper positions to insure a product which is of correct shape and size.

55. In a machine for making concrete blocks, a traveling carrier, sprocket wheels around which the carrier is passed, a plurality of rows of molds on the carrier, the molds being provided with flexibly mounted sides, and means on the sprocket wheels engageable with the underside of the molds for causing the sides of the molds to become disengaged from the blocks formed in the molds.

56. In a machine for making concrete blocks, a traveling carrier, sprocket wheels around which the carrier is passed, a plurality of rows of molds on the carrier, the molds of each row being provided with flexibly mounted sides, flexibly mounted cross division plates forming common partitions for the ends of the molds in adjacent rows, and means on the sprocket wheels engageable with the underside of the molds for causing the sides of the molds to become disengaged from the blocks formed in the molds.

57. In a machine for making concrete blocks, a traveling carrier having a plurality of rows of molds, cross division plates flexibly mounted and forming the transverse ends for adjacent pairs of rows of molds, and sprocket wheels for moving the traveling carrier, and for causing the flexibly mounted cross division plates to become disengaged from the blocks formed in adjacent pairs of molds.

58. In a machine for making concrete blocks, a traveling carrier having a plurality of rows of molds, cross division plates flexibly mounted and forming the transverse ends for adjacent pairs of rows of molds, sprocket wheels for moving the traveling carrier and for causing the flexibly mounted cross division plates to become disengaged from the blocks formed in adjacent pairs of molds, and means for retarding the cross division plates in their disengaging movement as the carrier starts to pass around the sprocket wheels.

59. In a machine for making concrete blocks, a traveling carrier provided with rows of molds, cross division plates flexibly mounted and forming a common transverse end for the adjacent pairs of rows of molds, means for locking rows of molds to the cross division plates, means for releasing said locking means, means for filling the molds with concrete, and means for rolling the tops of the molds, said rolling means also providing an automatic means for re-engaging said locking means.

60. In a machine for making concrete blocks, a traveling carrier provided with rows of molds, cross division plates flexibly mounted and each forming a common transverse end for adjacent pairs of rows of molds, a plurality of longitudinal sides each forming a common longitudinal side for adjacent molds in each row, other longitudinal sides for the end molds flexibly mounted on the traveling carrier, whereby said sides and plates are releasable from the bricks formed in the molds, means for automatically locking the longitudinal sides of the opposite end molds in each row to the division plates, means for automatically releasing the locking means to permit the sides and the plates to be released from the bricks, and means for causing the sides of the molds and the plates to be moved away from the bricks.

61. In a machine for making concrete blocks, a traveling carrier provided with rows of molds, cross division plates flexibly mounted and forming a common transverse end for the adjacent pairs of rows of molds, a plurality of longitudinal sides forming common intermediate sides for adjacent molds in each row, and other longitudinal sides for the end molds of the rows flexibly mounted on the traveling carrier whereby said sides and plates are releasable from the bricks formed in the molds, means for locking the molds of each row to the division plates, means for filling the molds, and means for rolling the concrete at the tops of the molds, said rolling means likewise providing means for holding the common intermediate sides in vertical position while the molds are being filled.

62. In a machine for making concrete blocks, a traveling carrier provided with rows of molds, means for filling the molds with concrete, said molds being provided with flexibly mounted sides and ends, whereby they are releasable from the cured bricks formed in the molds, means for locking the sids and ends in vertical position, means for releasing the locking means, and means synchronized with the movement of the traveling carrier adapted to pick the cured bricks from the expanded and opened molds.

63. In a machine for making concrete blocks, a traveling carrier formed of a plurality of pairs of pivoted links, a row of molds mounted transversely of each pair of links, cross division plates forming common transverse ends for adjacent pairs of rows of molds and having their ends pivotally mounted on the pivotal connection between the links, and means to prevent concrete from falling on the joints between the links of the carrier.

64. In a machine for making concrete blocks, a traveling carrier formed of jointed links and provided with a plurality of rows of molds, means for filling the molds with concrete, common partition plates forming ends for adjacent rows of molds, and means carried by the partition plates to prevent concrete from falling on the joints between the links of the carrier.

65. In a machine for making concrete blocks, a traveling carrier formed of a plurality of jointed links, a plurality of rows of molds mounted transversely of each link, cross division plates forming common transverse ends for adjacent pairs of rows of molds, and means on the cross division plates to prevent concrete from falling on the joints between the links of the carrier, said means being adapted to support the transverse edges of the bases of adjacent pairs of molds.

66. In a machine for making concrete blocks, a traveling carrier comprising a plurality of links pivotally connected together, the pivotal connection of the links forming axles for wheels supporting the traveling carrier, a row of molds mounted on each of the links, cross division plates forming common transverse ends for adjacent pairs of rows of molds, means on the cross division plates to prevent concrete from falling on the connections between the links of the traveling carrier, said links having depending sides embracing the wheels and connected to the protecting means on the cross division plates for preventing concrete from falling on the wheels of the carrier.

67. In a machine for making concrete blocks, an endless traveling carrier provided with rows of molds, sprocket wheels engaging the traveling carrier, pivotally mounted cross division plates forming common transverse ends for adjacent pairs of rows of molds, said plates being adapted to be moved out of engagement with the ends of the bricks in the molds, and means to maintain the cross division plates in engagement with the ends of the bricks in one row while said plates are out of engagement with the ends of an adjacent row of bricks, to prevent the cross division plates from interfering with the removal of the bricks.

68. In a machine for making concrete blocks, a traveling carrier provided with a plurality of molds, the sides and ends of said molds being flexibly mounted, means for maintaining the sides and ends of the molds in position against the blocks, means for curing the blocks, means for releasing the sides of the molds from the cured blocks, and means to prevent premature displacement of the cured blocks from the molds when the sides of said molds have been released from the blocks.

69. In a machine for making concrete blocks, pairs of spaced sprocket wheels rotatably mounted, an endless traveling carrier engageable with said wheels, a plurality of molds provided on the carrier having flexible sides which are adapted to be flexed away from the blocks, a pair of the sprocket wheels being connected by bars, the outer edges of which are curved and project beyond the peripheries of the sprocket wheels so as to engage the bases of each row of molds and transversely flex said bases whereby the flexible sides of the molds are moved away from the blocks.

70. In a machine for making concrete blocks, a traveling carrier, sprocket wheels around which the carrier is passed, a plurality of rows of molds on the carrier, the molds being provided with flexibly mounted sides and ends, means on the sprockets bearing against the under sides of the molds to open the molds in one direction, the curvature of the sprocket wheels effecting the opening of the molds in the opposite direction.

71. In a machine for making concrete blocks, a traveling carrier provided with a plurality of molds, means for filling the molds with concrete, means for jarring the molds as they are filled and continuing the jarring action in diminishing degree as the molds leave the filling means, a steam chest for curing the concrete blocks formed in the molds, said steam chest being provided with doors which are closed when the molds have been moved into the steam chest, means for stopping the movement of the carrier while the molds are in the steam chest, and means for admitting steam to the steam chest.

72. In a machine for making concrete blocks, a traveling carrier provided with a plurality of molds, a steam chest in the path of movement of the carrier, said steam chest being open at opposite ends to allow for the passage of the carrier through the steam chest, means for closing said openings, and means for admitting steam to the steam chest.

73. In a machine for making concrete blocks, a traveling carrier provided with molds, a steam chest open at opposite ends, means located near one end of the steam chest for filling the molds with concrete, rails extending from the filling means through the steam chest on which rails the carrier is adapted to run, means for moving the traveling carrier with the molds into the steam chest, means for closing the steam chest, means for admitting steam to the chest after the latter is closed, and means for stopping the movement of the carrier while the molds are in the steam chest.

74. In a machine for making concrete blocks, a traveling carrier provided with a plurality of molds, a steam chest open at both ends, rails provided within the steam chest, rails arranged outside the steam chest and in alinement with the rails in the steam chest, means for filling the molds with concrete located above the rails which are outside the steam chest, jarring means for jarring the molds outside the steam chest, means for moving the carrier and the molds into the steam chest, means for stopping the movement of the carrier so as to retain the filled molds within the steam chest, and means for admitting steam to the steam chest.

75. In a machine for making concrete blocks, a traveling carrier provided with a plurality of molds, a steam chest in the path of movement of the carrier, said steam chest being provided with open ends, means for filling the molds outside the steam chest, means for jarring the molds during the filling thereof and until they reach the steam chest, means for stopping the movement of the carrier when the molds are within the steam chest, and means for admitting steam to the steam chest during the time that the molds are within the latter.

76. In a machine for making concrete blocks, a traveling carrier provided with a plurality of molds, a steam chest in the path of movement of the carrier and having open ends to allow for the passage of the carrier through said chest, means providing a closure for said open ends, means for admitting steam to the steam chest, said steam chest having a roof sloping to the sides to carry the water of condensation to the sides of the chest and prevent the water from dripping on the product.

77. In a machine for making concrete blocks, a steam chest provided with a sloping roof, straight sides and a trough at the bottom, ledges at opposite sides of the trough and above the same, rails supported on said ledges, and drain passages leading from the sides to the trough through the ledges.

78. In a machine for making concrete blocks, a steam chest provided with a sloping roof, straight sides and a trough at the bottom, ledges at opposite sides of the trough and above the same, and rails supported on said ledges.

79. In a machine for making concrete blocks, a plurality of molds mounted on a traveling carrier, means for filling the molds with concrete, a steam chest for curing the concrete blocks formed in the molds, means for moving the traveling carrier and the molds into the steam chest, means for stopping the movement of the carrier when the molds are in the steam chest, said steam chest being provided with doors which are automatically closed when the molds have been moved into the steam chest, and means for admitting steam to the chest.

80. In a machine for making concrete blocks, a plurality of molds mounted on a traveling carrier, means for filling the molds with concrete, a steam chest for curing the blocks formed in the molds, means for moving the traveling carrier and the molds into the steam chest, said steam chest provided with automatically closing doors which are closed when the molds have been moved into the steam chest, means for admitting steam to the chest, means for stopping the movement of the carrier, and means for draining the chest of water formed by the condensed steam.

81. In a machine for making concrete blocks, an endless traveling carrier provided with wheels, spaced rails pivotally mounted at one of their ends, the wheels of the traveling carrier being adapted to ride on the rails, a hopper mounted above the free ends of the rails, a plurality of molds mounted on the traveling carrier and adapted to pass beneath the hopper to be filled with concrete from the hopper, means associated with the hopper for raising and suddenly dropping the rails and that portion of the traveling carrier and the molds riding thereon, whereby the concrete in the molds is jarred, pressed and rammed by the concrete in the hopper, a steam chamber into which the traveling carrier is adapted to be moved, and spaced rails rigidly mounted in said chamber and alining with the ends of the first-mentioned rails for supporting the traveling carrier in said chamber.

82. In a machine for making concrete blocks, the combination with a traveling carrier provided with molds, of means for spraying the underside of the molds having cores with a cold fluid while the blocks are in the molds for the purpose of contracting the cores and allowing the blocks to be removed therefrom, and means arranged below the carrier for catching the fluid dripping from the molds.

83. In a machine for making concrete blocks, the combination with a traveling carrier provided with molds having cores, of means for filling the molds with concrete, means for jarring the molds with the concrete therein, means for subjecting the concrete in the molds to the action of artificial heat, and means for subjecting the molds to the action of a cold fluid for contracting the cores to permit the withdrawal of the blocks from the molds.

84. In a machine for making concrete blocks, the combination with a traveling carrier provided with molds, of means for spraying the molds having cores with a cold fluid while the blocks are in the molds, for the purpose of contracting the cores and allowing the blocks to be removed therefrom.

85. In a machine for making concrete blocks, the combination with a traveling carrier provided with a series of molds having cores, of means for subjecting the blocks while in the molds to the action of artificial heat, to cure the blocks, and means for subjecting the molds to the action of a cold fluid for the purpose of contracting the cores to release the blocks.

86. In a machine for making concrete blocks, the combination with a traveling carrier provided with molds having cores, of a steam chest into which the carrier with the molds are caused to enter, means for subjecting the blocks within the molds to the action of artificial heat while in the curing chamber, and means outside the curing chamber for subjecting the cores to the action of a cold fluid for the purpose of contracting the cores and permitting the release of the blocks from the molds.

87. In a machine for making concrete blocks, a traveling carrier provided with a plurality of molds, means for driving the carrier, means for filling the molds with concrete, means for curing the concrete in the molds, means for picking the cured blocks out of the molds, and means for receiving the blocks picked from the molds, said picking means comprising arms oscillatable between the successively moved molds and said receiving means and provided with jaws for gripping the blocks, means for closing the jaws on the blocks, means for moving the oscillatable arms and the jaws with the confined blocks above the receiving means, and means for releasing the jaws when located above the receiving means.

88. In a machine for making concrete blocks, the combination with a traveling carrier provided with a plurality of molds, of a picking or unloading mechanism comprising a frame mounted on wheels, and oscillatable arms mounted on the frame and provided with jaws for picking the blocks out of the molds, and means for moving the arms.

89. In a machine for making concrete blocks, the combination with a traveling carrier provided with molds having cores, a hopper for delivering concrete into the molds, means for jarring the molds, a steam chest through which the carrier passes, means for stopping the movement of the carrier when the molds are within the steam chest, means for then closing the steam chest, means for admitting steam to the steam chest after the same is closed, means for subsequently subjecting the cores to the action of a cold fluid to contract the cores, an unloading mechanism for picking the blocks out of the molds, and conveying mechanism to which the unloading mechanism delivers the blocks for carrying the latter to another part of the plant.

90. In a machine for making concrete blocks, the combination with a traveling carrier provided with molds, an unloading mechanism provided with picking means to pick the blocks out of the molds, a roller carrier connected with the unloading mechanism for receiving the blocks therefrom, and a gravity roller or belt conveyer to receive the blocks from the roller carrier.

91. In a machine for making concrete blocks, the combination with a traveling carrier provided with molds arranged in rows, pivoted latches for connecting adjacent rows to each other, said latches being gravity operated, means for releasing the latches, and means for returning the latches to their locked positions.

92. In a machine for making concrete blocks, a traveling carrier provided with a plurality of rows of molds, the molds in each row being so connected together as to have a common base, sprockets for operating the traveling carrier, the opposite ends of each row of molds being pivoted to the traveling carrier, and means connected with the sprockets and engaging the common base of each row for flexing said base, the position of the pivotal connection being so disposed between the top and bottom edges of the opposite end sides of each row that the lower edges of opposite end sides will move inwardly towards each other while the upper edges will move outwardly and in opposite direction from each other, whereby the distance between the ends of the base will be foreshortened when said base is flexed and eliminate strains on the traveling carrier and the molds.

93. In a machine for making concrete blocks, the combination with a traveling carrier provided with molds having cores, of means for spraying the underside of the molds with a cold fluid while the blocks are in the molds for the purpose of contracting the cores and allowing the blocks to be removed therefrom, means arranged below the carrier for catching the fluid dripping from the molds, and means for spraying the interior of the molds with oil before said molds are filled with concrete to prevent the concrete from sticking to the molds.

94. In a machine for making concrete blocks, the combination with a traveling carrier provided with molds, of a curing chamber through which the traveling carrier is caused to pass, said chamber having openings at opposite ends, gravity-actuated doors for closing the openings, and means on the traveling carrier for raising the doors to allow the entrance and the exit of the molds from said chamber.

95. In a machine for making concrete blocks, the combination with a traveling carrier provided with molds, of a curing chamber having openings at opposite ends through which the traveling carrier is passed, doors for closing the openings of the chamber, said doors being actuated by the movement of the traveling carrier to open said doors to allow the entrance and the exit of the molds.

96. In a machine for making concrete blocks, the combination with a traveling carrier provided with molds having open upper faces, of a curing chamber into which the carrier with the molds is caused to enter, said curing chamber being provided with an opening, and a door for closing said opening actuated by the traveling carrier, said door being provided with a roller which travels upon the molds and is held in such position by the weight of the door.

In testimony that I claim the foregoing as my own, I have hereto affixed my signature.

WILLIAM H. CAREY.